US012623904B2

(12) United States Patent
AlQahtani et al.

(10) Patent No.: US 12,623,904 B2
(45) Date of Patent: May 12, 2026

(54) REMOVAL OF SULFUR COMPOUNDS FROM GAS

(71) Applicant: Saudi Arabian Oil Company, Dhahran (SA)

(72) Inventors: Mohammad Saad AlQahtani, Dhahran (SA); Seung-Hak Choi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 799 days.

(21) Appl. No.: 17/958,938

(22) Filed: Oct. 3, 2022

(65) Prior Publication Data

US 2024/0109776 A1 Apr. 4, 2024

(51) Int. Cl.
*B01D 53/14* (2006.01)
*B01D 19/00* (2006.01)
(Continued)

(52) U.S. Cl.
CPC ...... *C01B 17/0456* (2013.01); *B01D 19/0031* (2013.01); *B01D 53/1481* (2013.01); (Continued)

(58) Field of Classification Search
None
See application file for complete search history.

(56) References Cited

U.S. PATENT DOCUMENTS 4,632,818 A * 12/1986 Chen .................. C01B 17/0413
110/348
6,451,252 B1 9/2002 Ruan et al.
(Continued)

FOREIGN PATENT DOCUMENTS

CA 2764156 12/2010
CA 2921749 8/2017
(Continued)

OTHER PUBLICATIONS

Foster, "Plasma-based water Purification: Challenges and Prospects for the Future," Physics of Plasmas, 2017, 24:055501, 17 pages.
(Continued)

*Primary Examiner* — Sheng H Davis
(74) *Attorney, Agent, or Firm* — Fish & Richardson P.C.

(57) ABSTRACT

A system and method for removing sulfur compounds from gas, including discharging tail gas having sulfur compounds from a sulfur recovery unit (SRU) to a non-thermal plasma (NTP) catalytic unit including an NTP reactor, providing oxidant to the NTP reactor and placing the oxidant in an NTP state in the NTP reactor to give an oxidative reactive species formed from the oxidant, converting (oxidizing) the sulfur compounds with the oxidative reactive species and catalyst in the NTP catalytic unit into sulfur oxides ($SO_x$) to discharge the tail gas as treated having the formed $SO_x$ without the sulfur compounds that were converted. The $SO_x$ is absorbed into water in a quench tower to give the tail gas beneficially having only small amounts (e.g., less than 200 ppmv) of sulfur compounds. $SO_x$ may be degassed from water discharged from the quench tower and sent to the SRU furnace.

11 Claims, 11 Drawing Sheets

300

(51) Int. Cl.
    *B01D 53/86*     (2006.01)
    *C01B 17/04*     (2006.01)
(52) U.S. Cl.
    CPC ....... *B01D 53/8612* (2013.01); *B01D 53/864* (2013.01); *C01B 17/0413* (2013.01); *C01B 17/0426* (2013.01); *B01D 2252/103* (2013.01)

(56) References Cited

U.S. PATENT DOCUMENTS

| | | |
|---|---|---|
| 7,901,578 B2 | 3/2011 | Pruet |
| 7,994,374 B2 | 8/2011 | Talley et al. |
| 8,702,994 B2 | 4/2014 | Frost et al. |
| 8,728,325 B2 | 5/2014 | Hussain et al. |
| 8,980,798 B2 | 3/2015 | Tian et al. |
| 8,992,780 B2 | 3/2015 | Champion et al. |
| 9,637,404 B2 | 5/2017 | Minnich et al. |
| 10,106,411 B2 | 10/2018 | Ballaguet et al. |
| 10,384,967 B2 | 8/2019 | Hancock et al. |
| 10,392,271 B2 | 8/2019 | Janson et al. |
| 11,000,778 B2 | 5/2021 | Rithauddeen et al. |
| 11,040,904 B2 | 6/2021 | Herron et al. |
| 11,691,119 B2 | 7/2023 | Zhang et al. |
| 2010/0224561 A1 | 9/2010 | Marcin |
| 2010/0300872 A1 | 12/2010 | Gutsol et al. |
| 2013/0168315 A1 | 7/2013 | Matar et al. |
| 2018/0370834 A1 | 12/2018 | Sutton-Sharp |
| 2019/0118114 A1 | 4/2019 | Rithauddeen et al. |
| 2020/0398245 A1 | 12/2020 | Zhang et al. |
| 2023/0183588 A1 | 6/2023 | Al-Qahtani et al. |
| 2024/0109034 A1 | 4/2024 | AlQahtani et al. |
| 2024/0150203 A1 | 5/2024 | AlQahtani et al. |

FOREIGN PATENT DOCUMENTS

| | | | | |
|---|---|---|---|---|
| CN | 1386563 | | 12/2002 | |
| CN | 103043840 | | 4/2013 | |
| CN | 106277531 | | 1/2017 | |
| CN | 108970349 | A | 12/2018 | |
| CN | 110127623 | | 8/2019 | |
| EP | 2770041 | | 8/2014 | |
| KR | 101189834 | | 9/2012 | |
| KR | 102202958 | | 1/2021 | |
| WO | WO9830312 | * | 7/1998 | |
| WO | WO-9830312 A1 | * | 7/1998 | ........... B01D 53/007 |
| WO | WO 2013093789 | | 6/2013 | |
| WO | WO 2013121217 | | 8/2013 | |

OTHER PUBLICATIONS

Kelland, "A Review of Kinetic Hydrate Inhibitors from an Environmental Perspective," Energy and Fuels, 2018, 32:12001-12012, 39 pages.

Sanito et al., "Degradation of contaminants in plasma technology: An overview," Journal of Hazardous Materials, 2022, 424:127390, 20 pages.

Sato et al., "Degradation of organic contaminants in water by plasma," International Journal of Plasma Environmental Science and Technology, Mar. 2009, 3(1):8-14, 7 pages.

Singh et al., "Rapid Removal of Poly- and Perfluorinated Compounds from Investigation-Derived Waste (IDF) in a Pilot-Scale Plasma Reactor," Environmental Science & Technology, 2019, 29 pages.

Wang et al., "Performance Evaluation of Hybrid Gas-Liquid Pulse Discharge Plasma-Induced Degradation of Polyvinyl Alcohol-Containing Wastewater," Plasma Chem Plasma Process, 2014, 34:1115-1127, 13 pages.

Zeghioud et al., "Review on Discharge Plasma for Water Treatment: Mechanism, Reactor Geometries, Active Species and Combined Processes," Journal of Water Process Engineering, 2020, 38, 101664, 13 pages.

SAIP Examination Report in Saudi Arabian Appln. No. 123450490, dated Nov. 10, 2024, 16 pages (with English translation).

Borraccia et al., "Oxygen enrichment in Sulphur plants to reduce the life cycle costs of new-build, large gas plants," Abu Dhabi International Petroleum Exhibition & Conference, Nov. 2016, 15 pages.

Dang et al., "Research on decomposition of hydrogen sulfide using non-thermal plasma with metal oxide catalysis," Energy Procedia, 2012, 16:856-862, 7 pages.

DuPont.com [online], "DuPont Ligasep degasification modules," Mar. 2020, retrieved on Jul. 14, 2022, retrieved from URL <https://www.dupont.com/content/dam/dupont/amer/us/en/water-solutions/public/documents/en/45-D02249-en.pdf>, 4 pages.

He et al., "Dielectric Barrier Discharge for Hydrogen Sulphide Waste Gas Decomposition," IOP Conference Series: Earth and Environmental Science, Feb. 2019, 237:22052, 8 pages.

Jarrige et al., "Decomposition of Gaseous Sulfide Compounds in Air by Pulsed Corona Discharge," Plasma Chemistry and Plasma Processing, May 2007, 27:241-255, 15 pages.

Kolbasi, "Oxygen enrichment at Sulphur recovery unit," Refining Community Presentation, May 2018, 27 pages.

Palma et al., "A review about the recent advances in selected nonthermal plasma assisted solid-gas phase chemical processes," Nanomaterials, Aug. 2020, 10:1596, 56 pages.

Papasidero et al., "Improving operability and process understanding of sulfur recovery unit," Chemical Engineering Transactions, May 2012, 26:237-242, 6 pages.

Paskall et al., "Can oxygen enrichment replace tail gas clean up in sulphur recovery?" Sulphur Recovery, Western Research, 8th edition, 2003, Chapter 8-3, 8 pages.

Paskall et al., "So you don't have a COS/CS2 problem, eh?" Sulphur Recovery, Western Research, 8th edition, 2003, Chapter 2-79, 5 pages.

Reddy et al., "Kinetics of hydrogen sulfide decomposition in a DBD plasma reactor operated at high temperature," Journal of Energy Chemistry, 2013, 22:382-386, 5 pages.

Xuan et al., "Plasma oxidation of H2S over non-stoichiometric LaxMnO3 perovskite catalysts in a dielectric barrier discharge reactor," Catalysts, Aug. 2018, 8:317, 14 pages.

* cited by examiner

100

300

Figures 4, 5:
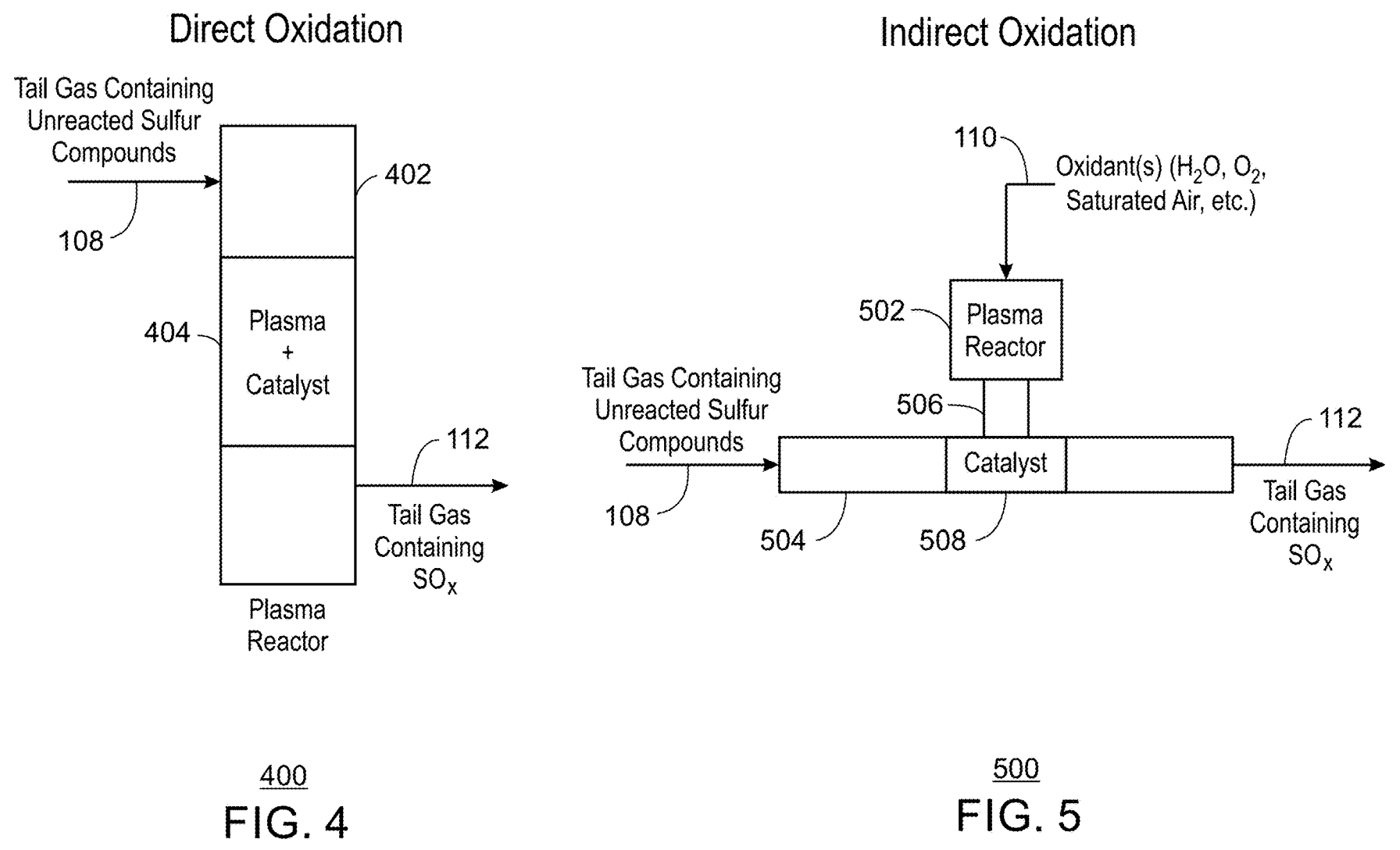

Indirect Oxidation

110 → Oxidant(s) ($H_2O$, $O_2$, Saturated Air, etc.)

502 Plasma Reactor

506

508 Catalyst

504

108 Tail Gas Containing Unreacted Sulfur Compounds

112 Tail Gas Containing $SO_x$

Direct Oxidation

402

404 Plasma + Catalyst

Plasma Reactor

108 Tail Gas Containing Unreacted Sulfur Compounds

112 Tail Gas Containing $SO_x$

Dielectric Material

Catalyst

Grounding

700

800

900

1000

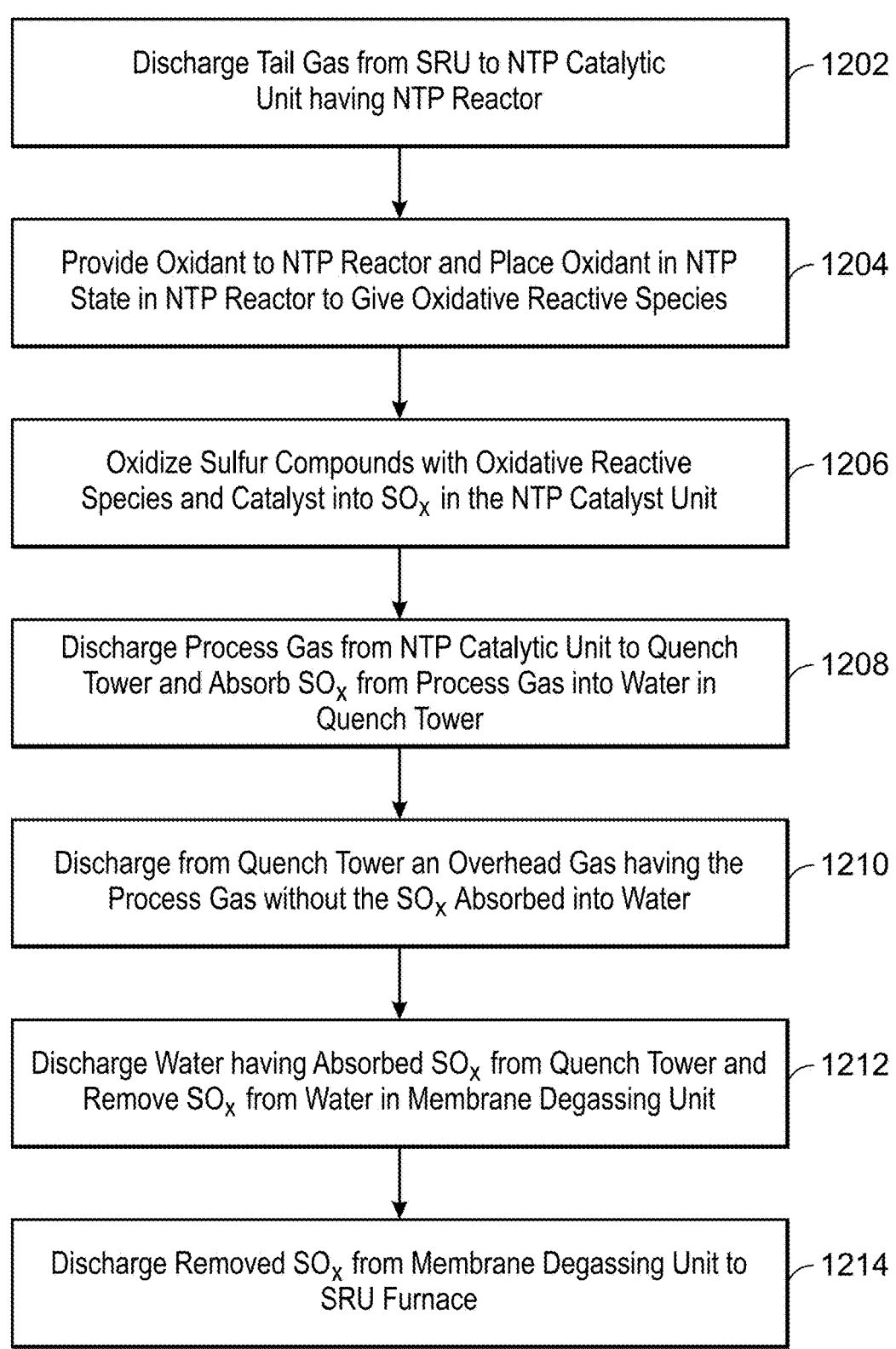

Discharge Tail Gas from SRU to NTP Catalytic Unit having NTP Reactor ⌐1202

Provide Oxidant to NTP Reactor and Place Oxidant in NTP State in NTP Reactor to Give Oxidative Reactive Species ⌐1204

Oxidize Sulfur Compounds with Oxidative Reactive Species and Catalyst into $SO_x$ in the NTP Catalyst Unit ⌐1206

Discharge Process Gas from NTP Catalytic Unit to Quench Tower and Absorb $SO_x$ from Process Gas into Water in Quench Tower ⌐1208

Discharge from Quench Tower an Overhead Gas having the Process Gas without the $SO_x$ Absorbed into Water ⌐1210

Discharge Water having Absorbed $SO_x$ from Quench Tower and Remove $SO_x$ from Water in Membrane Degassing Unit ⌐1212

Discharge Removed $SO_x$ from Membrane Degassing Unit to SRU Furnace ⌐1214

REMOVAL OF SULFUR COMPOUNDS FROM GAS

TECHNICAL FIELD

This disclosure relates to removal of sulfur compounds from gas, such as from industrial tail gas streams.

BACKGROUND

Hydrogen sulfide can be a byproduct of processing natural gas and refining sulfur-containing crude oils. Other industrial sources of hydrogen sulfide may include pulp and paper manufacturing, chemical production, waste disposal, and so forth. In certain instances, hydrogen sulfide can be considered a precursor to elemental sulfur.

Sulfur recovery may refer to conversion of hydrogen sulfide ($H_2S$) to elemental sulfur, such as in a sulfur recovery unit (SRU), e.g., Claus system. The most prevalent technique of sulfur recovery is the Claus system, which may be labeled as the Claus process, Claus plant, Claus unit, and the like. The Claus system includes a thermal reactor (e.g., a furnace or reaction furnace) and multiple catalytic reactors to convert $H_2S$ into elemental sulfur.

A conventional Claus system can recover between 95% and 98% of $H_2S$. The percent recovery may depend on the number of Claus catalytic reactors. The tail gas from the Claus system may have the remaining (residual) $H_2S$, such 2% to 5% of the equivalent $H_2S$ in the feed gas. The Claus tail gas can be treated to recover this remaining $H_2S$ equivalent. In particular, a tail gas treatment (TGT) unit, also known as TGTU, can increase sulfur recovery to or above 99.9%. Environmental regulations regarding sulfur oxides ($SO_x$) emissions may place requirements on sulfur recovery efficiency in commercial sulfur recovery.

Carbon dioxide is the primary greenhouse gas emitted through human activities. Carbon dioxide ($CO_2$) may be generated in various industrial and chemical plant facilities. At such facilities, avoiding or reducing emissions of $CO_2$ may beneficially decrease the $CO_2$ footprint of the facility.

SUMMARY

An aspect relates to a method of removing sulfur compounds from a gas, including discharging a tail gas having sulfur compounds from a sulfur recovery unit (SRU) to a non-thermal plasma (NTP) catalytic unit including an NTP reactor, providing an oxidant to the NTP reactor and placing the oxidant in an NTP state in the NTP reactor to give an oxidative reactive species formed from the oxidant, oxidizing the sulfur compounds with the oxidative reactive species and catalyst in the NTP catalytic unit into sulfur oxides ($SO_x$), and discharging process gas from the NTP catalytic unit to a quench tower, the process gas including the tail gas minus the sulfur compounds oxidized into $SO_x$ and having the $SO_x$ formed by oxidizing the sulfur compounds. The method includes absorbing $SO_x$ from the process gas into water in the quench tower, discharging from the quench tower an overhead gas having the process gas without the $SO_x$ absorbed into the water, discharging from the quench tower a bottoms stream including the water having the $SO_x$ as absorbed to a membrane degassing unit having a membrane, and removing $SO_x$ from the water in the membrane degassing unit. The method includes discharging the $SO_x$ as removed from the membrane degassing unit to a reaction furnace of the SRU.

Another aspect is a system for removing sulfur compounds from a gas, including an NTP catalytic unit operationally coupled to an SRU to receive SRU tail gas having sulfur compounds discharged from the SRU and oxidize the sulfur compounds via a catalyst and an oxidative reactive species into $SO_x$. The NTP catalytic unit includes an NTP reactor to receive an oxidant and place the oxidant in an NTP state to give the oxidative reactive species formed from the oxidant. The system includes a quench tower operationally coupled to the NTP catalytic unit to receive process gas discharged from the NTP catalytic unit and absorb $SO_x$ from the process gas into water, and discharge an overhead gas having the process gas without the $SO_x$ absorbed into the water and discharge a bottoms stream including the water having the $SO_x$ as absorbed. The system includes a membrane degassing unit comprising a membrane operationally coupled to the quench tower to receive the bottom stream and remove $SO_x$ from the bottom stream and discharge the $SO_x$ as removed to a reaction furnace of the SRU.

The details of one or more implementations are set forth in the accompanying drawings and the description below. Other features and advantages will be apparent from the description and drawings, and from the claims.

BRIEF DESCRIPTION OF DRAWINGS

FIG. 4 is a diagram of an NTP catalytic unit having an NTP catalytic reactor.

FIG. 5 is a diagram of an NTP catalytic unit having an NTP reactor (not an NTP catalytic reactor) and a vessel.

FIG. 12 is a block flow diagram of a method of removing sulfur compounds from a gas.

Like reference numbers and designations in the various drawings indicate like elements.

DETAILED DESCRIPTION

Figure 1:
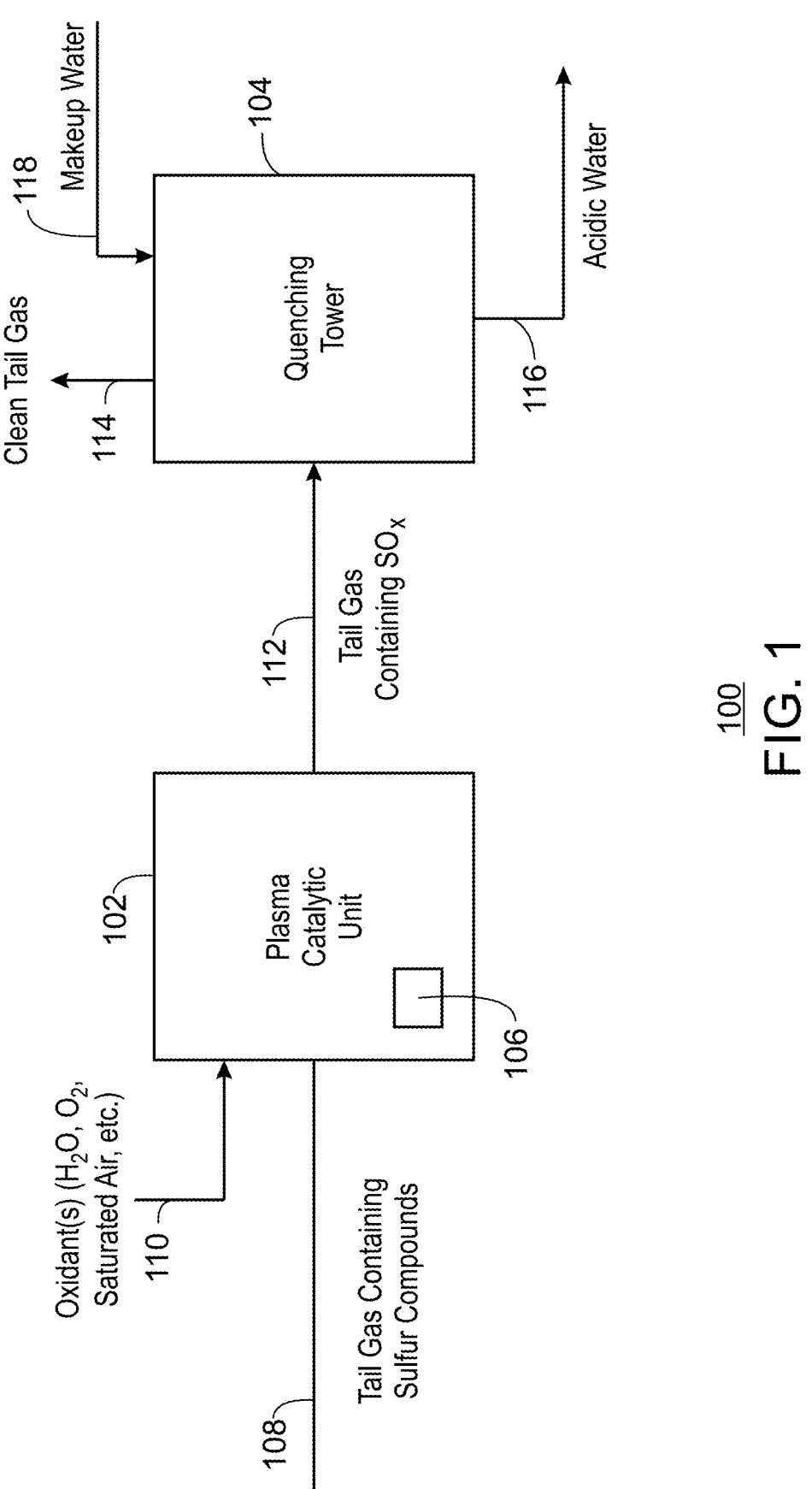
FIG. 1 is a diagram of a system for removing sulfur compounds from a gas.

Some aspects of the present disclosure are directed to applying non-thermal plasma (NTP) (with catalyst) to remove sulfur compounds from tail gas (e.g., Claus tail gas) of a sulfur recovery unit (SRU) (e.g., Claus system). Thus, the NTP catalytic unit (and an associated quench tower) can be characterized as a tail gas treatment unit (TGT unit or TGTU). In operation, the NTP catalytic unit oxidizes the sulfur compounds (e.g., $H_2S$) into $SO_x$ that is then absorbed into water in the quench tower to give the sulfur removal. The water having the dissolved $SO_x$ may sent to a degassing (stripping) unit to remove the $SO_x$ gases that can be sent upstream to the SRU furnace (e.g., Claus furnace).

Embodiments of the present techniques are directed to removing gaseous sulfur compounds from a gas stream, such as from tail gas discharged by an SRU. Embodiments may utilize NTP and solid catalytic material(s) to oxidize the sulfur compounds to sulfur oxides ($SO_x$) for removal, and to oxidize carbon monoxide (CO) to carbon dioxide ($CO_2$).

The $SO_x$ may include sulfur dioxide ($SO_2$) and sulfur trioxide ($SO_3$). The $SO_x$ may be absorbed into water in a column vessel (e.g., a quench tower) to give acidic water having the absorbed $SO_x$. This acidic water may be fed to a membrane-based degassing (stripping) unit that recovers dissolved gas from the acidic water. The dissolved gas recovered from the acidic water may be fed, for example, to a reaction furnace in an SRU (e.g., Claus SRU).

Sulfur compounds (e.g., gaseous sulfur compounds) may be in industrial waste gas streams, such as Claus tail gas. The sulfur compounds may be, for example, hydrogen sulfide ($H_2S$), carbonyl sulfide (COS), carbon disulfide ($CS_2$), elemental sulfur (S) vapor, methanethiol ($CH_3SH$) (methyl mercaptan), and $SO_2$. In implementations, the tail gas is not emitted to the atmosphere (environment). Instead, the tail gas may be sent, for example, to a thermal oxidizer that oxidizes the sulfur compounds into $SO_2$. The thermal oxidizer may also oxidize carbon monoxide (CO) in the tail gas into carbon dioxide ($CO_2$). Unfortunately, the discharge of $SO_2$ from the thermal oxidizer to the environment may cause environmental concerns associated with $SO_x$ emissions.

Embodiments herein may reduce (decrease) $SO_2$ emissions associated with the processing of industrial tail gas streams, such as Claus tail gas. NTP may be combined with a catalyst(s) to oxidize gas sulfur compounds to $SO_x$ (and oxidize CO to $CO_2$) at relatively low temperatures (e.g., less than 250° C.). As mentioned, liquid water may be utilized to capture the generated $SO_x$ via absorption, hence removing sulfur compounds from the tail gas and eliminating or reducing the need for a thermal oxidizer. NTP can be operated at relatively wide range of temperatures (e.g., 30° C. to 800° C.) and near atmospheric pressure (e.g., in the range of 1 bar to 5 bar). The unit "bar" as used herein refers to bar absolute (bara).

Techniques herein for treating tail gas having sulfur compounds (e.g., $H_2S$, elemental sulfur (S) vapor, COS, $CS_2$, $CH_3SH$, $SO_2$, etc.) and CO may involve NTP (e.g. dielectric barrier discharge, corona, plus corona, arc discharge, etc.) to (1) activate water vapor and/or oxygen gas, (2) facilitate direct oxidation of the sulfur compounds to $SO_x$ and the CO to $CO_2$, and (3) activate or promote the catalyst(s) to facilitate the catalytic reactions at low temperatures (e.g., <250° C.). The catalyst(s) may be employed to enhance the conversion of sulfur compounds and CO, enhance properties of the plasma, and control products selectivity. As for products selectively, the catalyst may be selected or configured, for example, to favor oxidation over dissociation. The solid catalyst(s) can be placed fully or partially in the plasma discharge zone of the NTP or downstream of the plasma discharge zone. The plasma (NTP) treated gas may be sent to a quenching tower and washed by water that absorbs $SO_x$ gas. Membrane-based stripping of the water having the absorbed $SO_x$ gas can reduce energy consumption in stripping compared to a conventional steam-reboiled distillation column. Moreover, NTP oxidation generally does not employ fuel consumption and thus beneficially typically avoids $CO_2$ emissions. In implementations, the electrical power can be generated from renewable green energy sources, such as solar energy or wind-generated energy.

NTP may be utilized to activate an oxidant, such as water ($H_2O$) (refer to R1) or oxygen gas ($O_2$) (refer to R2). The activated species [hydroxide (OH) and elemental oxygen (O)] formed from the oxidant, are utilized to oxidize $H_2S$ (refer to R3 to R12), COS (refer to R13), $CS_2$ (refer to R14), S (refer to R15) and CO (refer to R16). While the main product of oxidizing sulfur compounds via plasma is $SO_x$, sulfuric acid can be a secondary product (R17) depending on the amount water present in the system. Oxidizing catalyst(s) can be used in plasma or post plasma to facilitate these reactions (R1 to R17). The plasma (NTP) catalytic unit can be a single stage or multi-stage unit(s) where multiple plasma catalytic units are employed operationally in series to achieve the targeted sulfur and CO removal level. The oxidant(s) (e.g. $H_2O$ and $O_2$) may coexist with the sulfur compounds in the tail gas and hence a direct plasma oxidation can be applied for the gas processed in the plasma catalytic reactor, e.g., as shown in FIG. 4. Alternatively, indirect plasma oxidation method can be applied in which a relatively smaller gas stream (having the oxidant(s)) (e.g. saturated air that is air saturated in water, as providing the oxidants) is activated in the plasma reactor to produce the oxidative reactive species, such as OH, O, and ozone ($O_3$), which are injected into the main tail gas stream (e.g., see FIG. 5). The indirect method/configuration has advantages of activating a smaller stream and protecting the high voltage electrode from corrosion due to sulfur compounds. On the other hand, the direct technique (e.g., FIG. 4) may have an advantage of avoiding quenching the short-lived reactive species during an injection.

$$H_2O \rightarrow OH + H \tag{R1}$$

$$2O_2 \rightarrow O + O_3 \tag{R2}$$

$$H_2S + OH \rightarrow HS + H_2O \tag{R3}$$

$$H_2S + O \rightarrow HS + OH \tag{R4}$$

$$SH + SH \rightarrow HS + OH \tag{R5}$$

$$SH + O \rightarrow SO + H \tag{R6}$$

$$SH + O_2 \rightarrow SO + OH \tag{R7}$$

$$SO + O \rightarrow SO_2 \tag{R8}$$

$$SO + OH \rightarrow SO_2 + H \tag{R9}$$

$$SO + O_2 \rightarrow SO_2 + O \tag{R10}$$

$$SO + O_2 \rightarrow SO_3 \tag{R11}$$

$$SO_3 + O \rightarrow SO_2 + O_2 \tag{R12}$$

$$COS + (3/2)O_2 \rightarrow SO_2 + CO_2 \tag{R13}$$

$$CS_2 + 3O_2 \rightarrow 2SO_2 + CO_2 \tag{R14}$$

$$S + O_2 \rightarrow SO_2 \tag{R15}$$

$$CO + (\frac{1}{2})O_2 \rightarrow CO_2 \tag{R16}$$

$$SO_3 + H_2O \rightarrow H_2SO_4 \tag{R17}$$

Non-thermal plasma (NTP) is non-equilibrium process, and contains (at low temperatures) radicals and excited states of atoms and molecules that only can exist at thermal equilibrium at much higher temperatures (e.g., greater than 1000° C.). Therefore, the chemical processes occurring in NTP are not possible in a system that is at thermal equilibrium. In NTP, highly-energetic electrons interact with gas molecules (electron impact reactions) to produce radicals, ions, and rotationally, vibrationally, and/or electronically excited molecules that facilitate chemical reactions at mild conditions. There are different techniques to produced NTP, such as dielectric barrier discharge (DBD), corona discharge, pulsed corona discharge, etc. DBD is generated when the voltage between two electrodes (having an intervening dielectric material) is higher than the breakdown voltage of the gas passing in between the two electrodes. At least one of the electrodes can be covered by a layer of the dielectric material. The minimum voltage difference to generate NTP depends on the gas composition, pressure, and the distance between the two electrodes.

Figure 6:
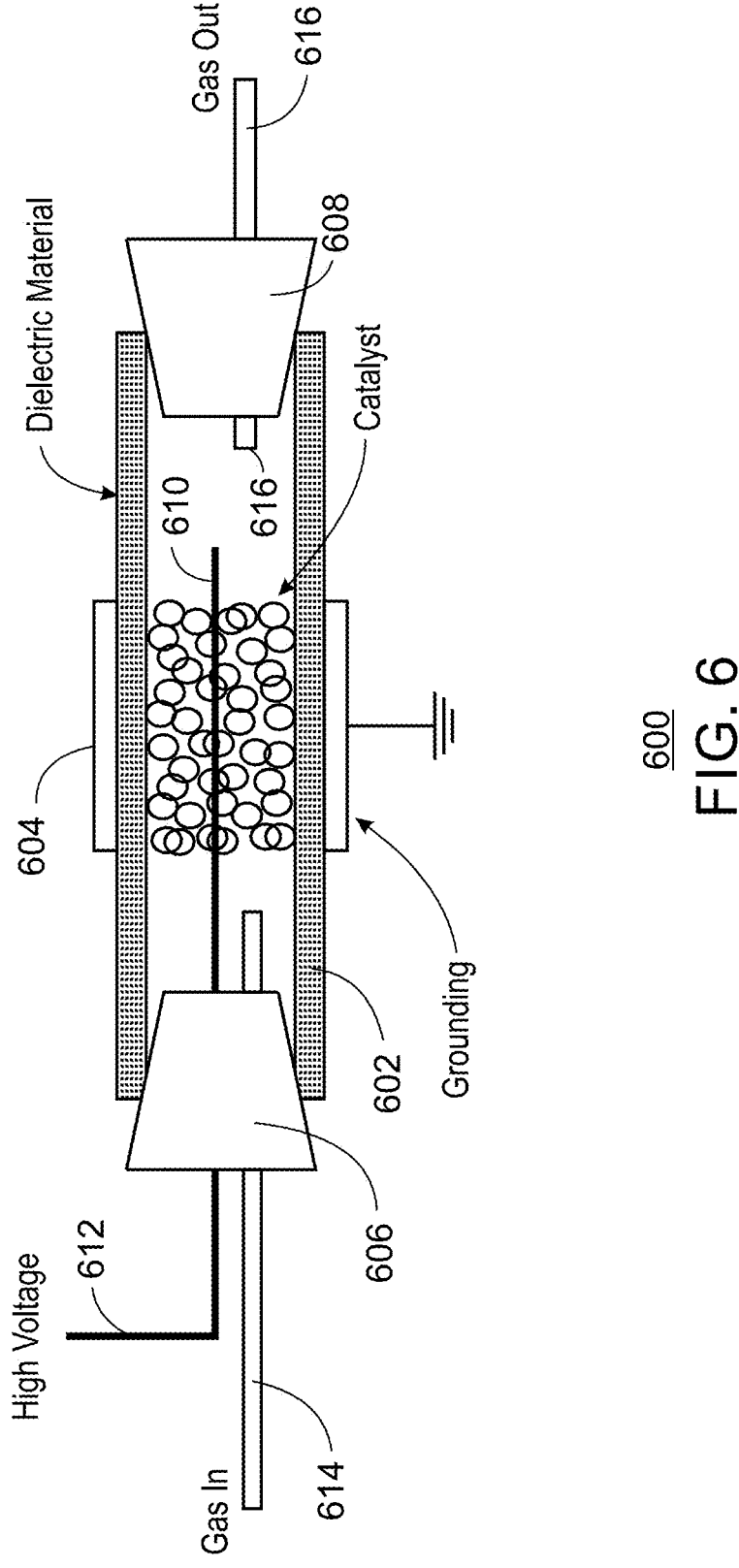
FIGS. 6-8 are diagrams of NTP reactors that each are a dielectric barrier discharge (DBD) reactor.
Figure 7:
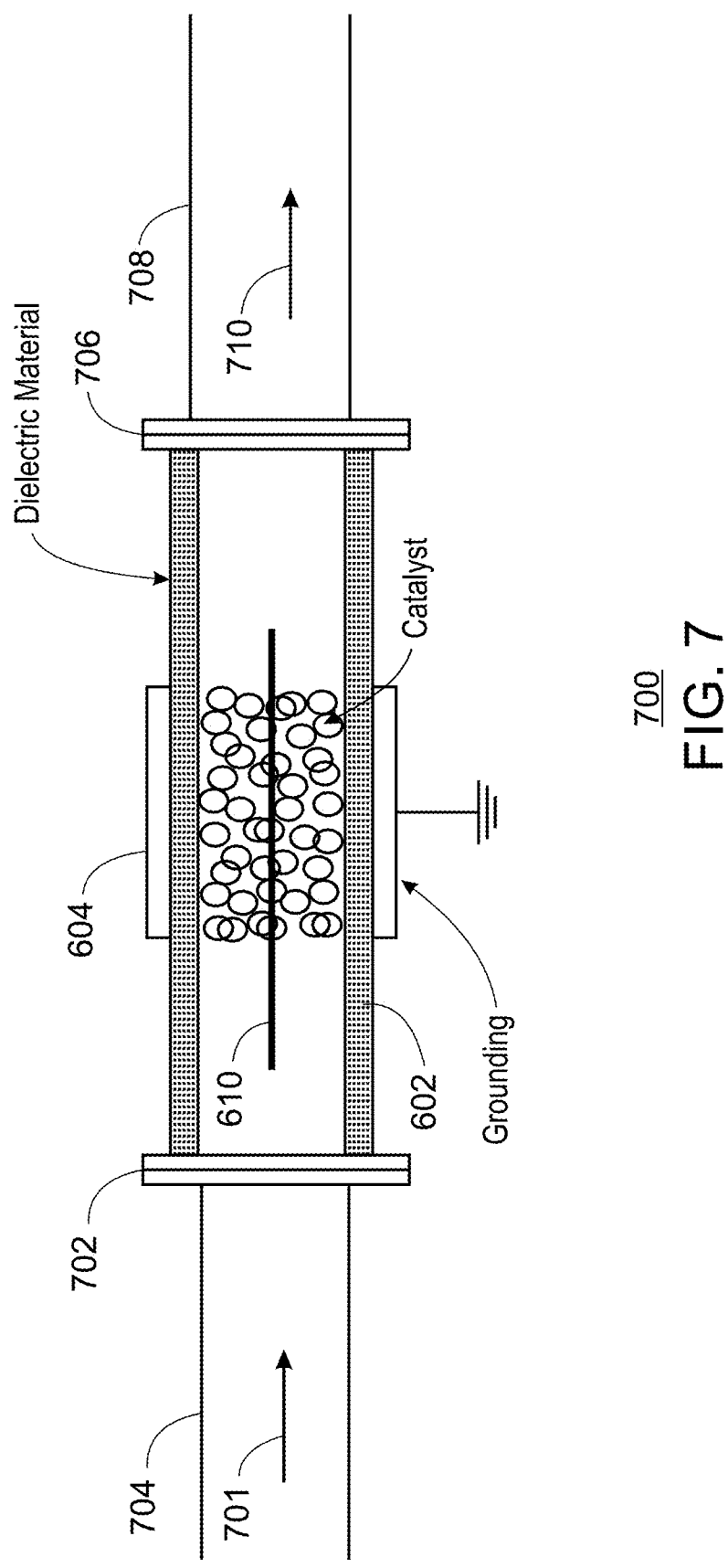
Figure 8:
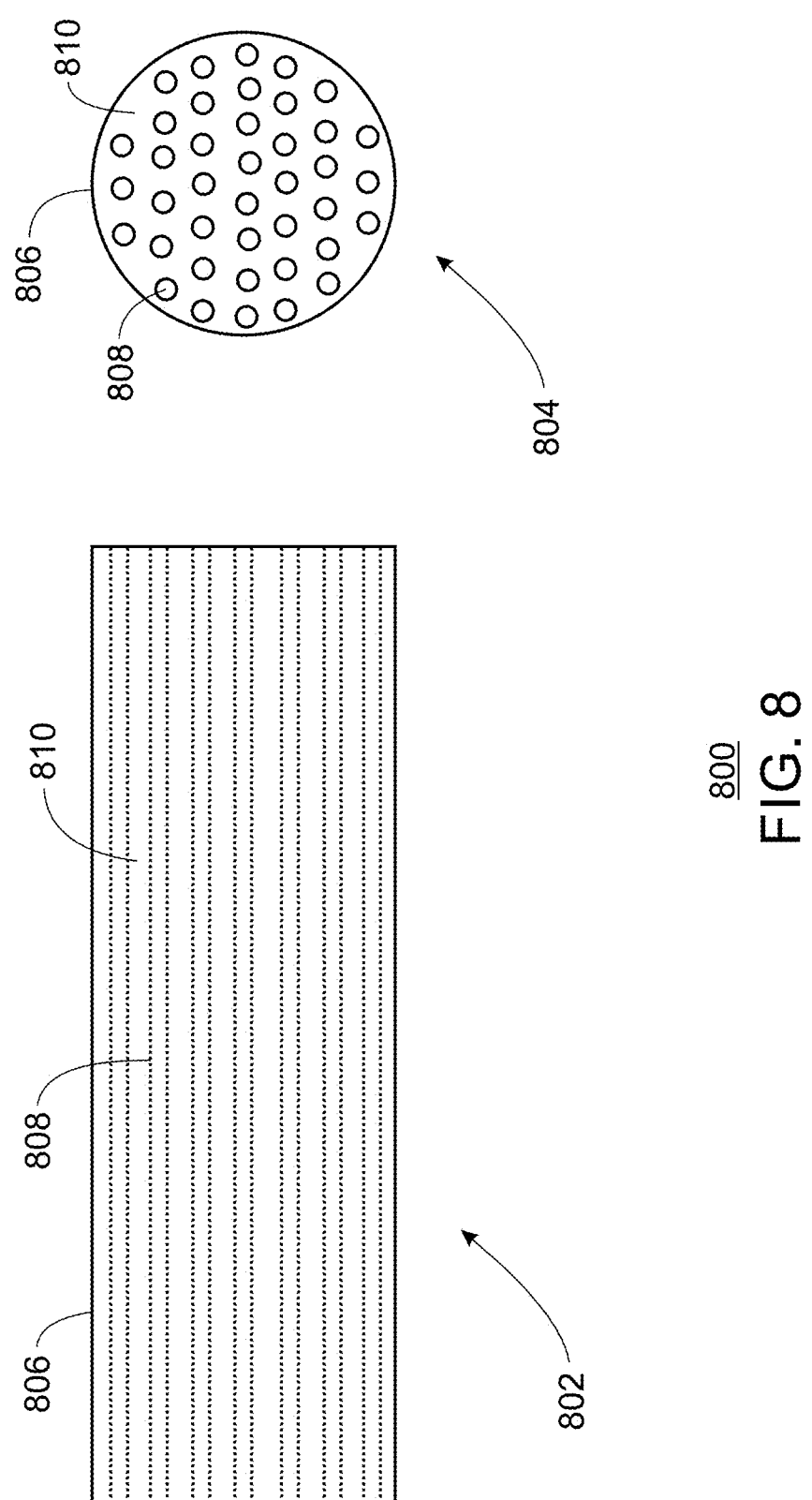

The aforementioned catalyst(s) can be placed in between electrodes in the NTP reactor to increase the gas conversion (oxidation) and/or control the product selectivity by providing an alternative reaction pathway with a lower energy barrier. The solid catalyst(s) may be placed fully or partially in the NTP reactor plasma-discharge zone (as in-plasma catalysis) and/or downstream of the NTP reactor discharge zone (as for post-plasma catalysis). A single catalyst or physical mixture of different catalysts may be utilized to catalyze different catalytic oxidation reactions (e.g., $H_2S$ oxidation, COS oxidation, etc.). FIGS. 6-7 show illustrative examples of simplified schematic diagrams of DBD-packed bed reactor (combining the plasma process with a catalyst(s)) for in-plasma catalysis), which is a packed-bed reactor with high voltage electrode (metal rod) inserted in the center and a grounding electrode (e.g. aluminum foil or mesh) wrapped around the reactor from the outside. The DBD reactors depicted in FIGS. 6-7 can also be applied without catalyst in the reactor with plasma only and without catalysis. FIG. 8 shows an example of a DBD having multiple DBD cylindrical tubes (each similarly configured as FIGS. 6-7) in one housing. In implementations, cooling or heating of the DBD reactor can be achieved by flowing water (for heating) or stream (for heating) in between the cylindrical tubes, such as similar with a shell and tube heat exchanger.

In disclosed processes herein, after most or all sulfur compounds in the tail gas are oxidized to $SO_x$ gases via plasma and catalysis, the treated gas is sent to a quenching tower. The primary purpose of the quench tower is to cool the hot tail gas (e.g., from 150-300° C. to around 40° C. or less) by direct contact with cooling water, to remove most of the water vapor in the tail gas and absorb $SO_x$ from the tail gas. Due to the high solubility of $SO_x$ gases in water, most of $SO_x$ gases will be captured by the water and hence relatively high sulfur removal levels can be achieved.

Figure 9:
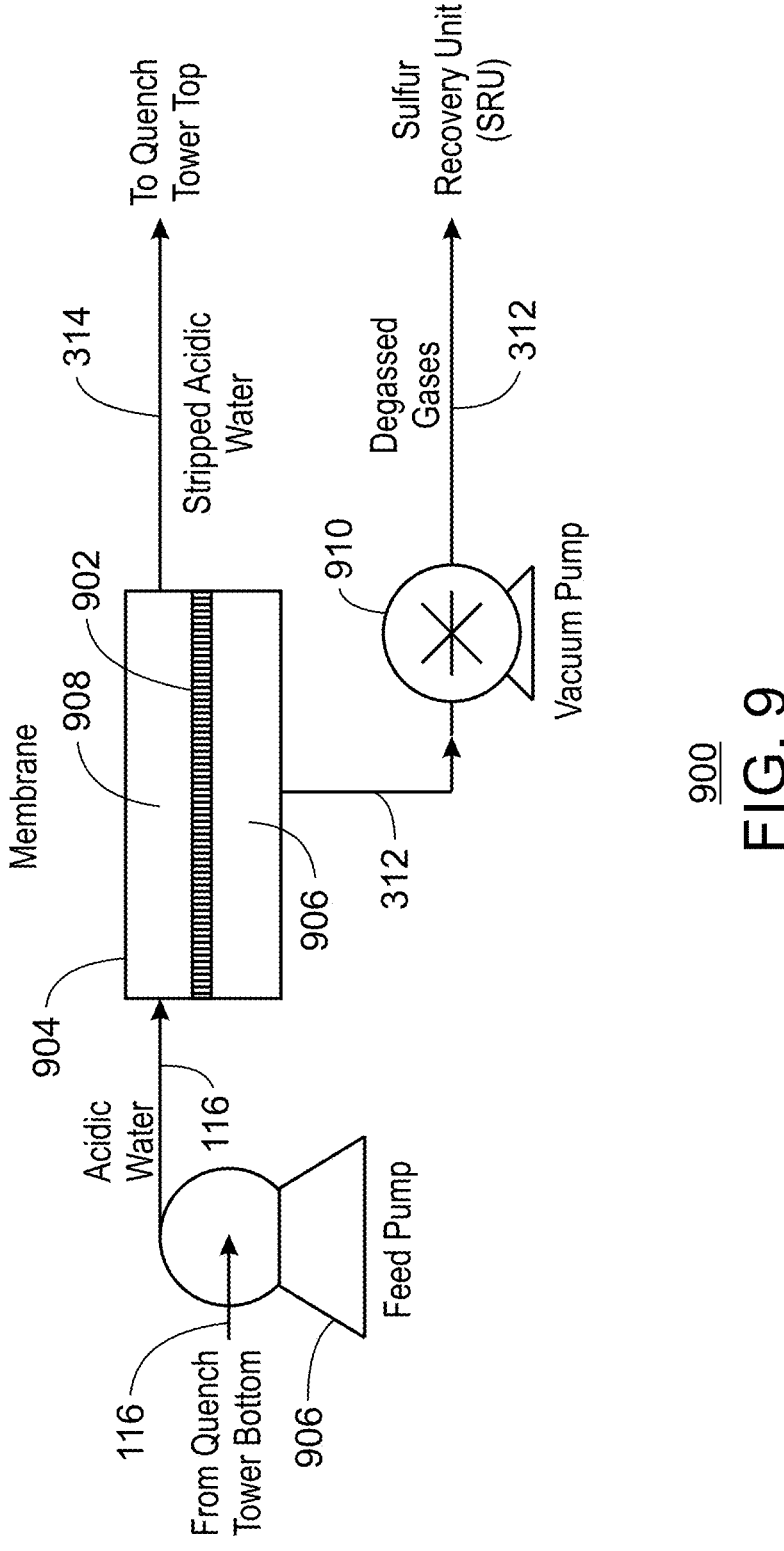
FIGS. 9-10 are diagrams of a respective membrane degassing unit.
Figure 10:
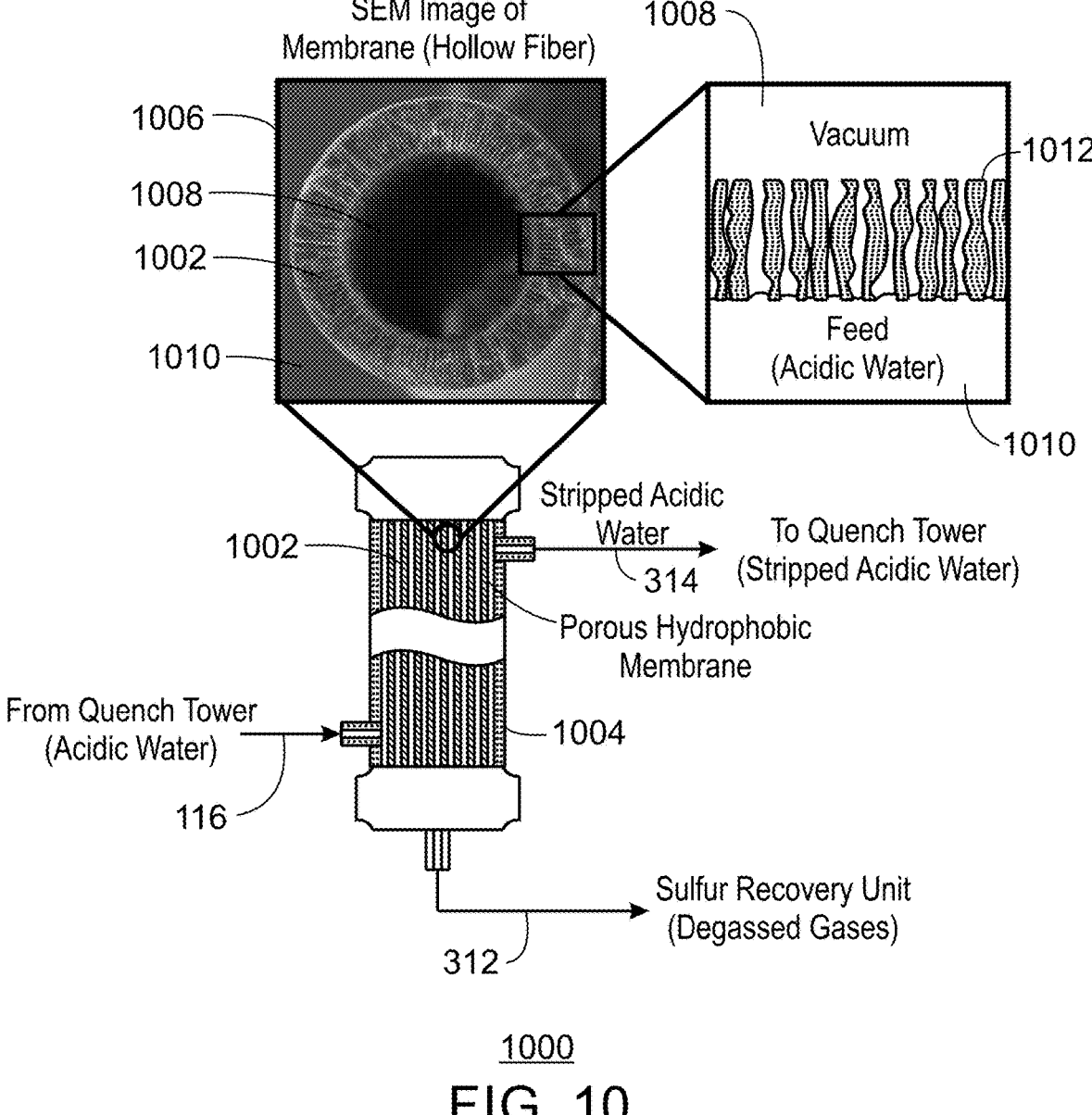

The acidic water (containing dissolved $SO_x$) leaving the bottom of the quenching tower is then sent to the acidic water stripping unit for further treatment. In particular, the membrane-based degassing process recovers dissolved gases from the acidic water stream. The removed dissolved gases may be sent to a reaction furnace in the Claus SRU. In the membrane degassing unit, the acidic water may be introduced on one side of the membrane(s) and a vacuum is applied on the other side of the membrane(s), e.g., as shown in FIGS. 9-10. Therefore, due to the pressure difference across the membrane material, dissolved $SO_x$ gases can be stripped from acidic water through the membrane as permeate.

Generally, the membrane may be formed of hydrophobic material. In some embodiments, the membrane is formed of an organic material, such as a polymer. Examples of polymers include polyvinylidenedifluoride (PVDF), polytetrafluoroethylene (PTFE or Teflon™), polyethylene (PE), polypropylene (PP), polyetheretherketone (PEEK), polybenzimidazole (PBI). The pore size of the mesoporous hydrophobic membrane is in the range of 0.02 micrometer (μm) to 2.0 μm. A narrower distribution of pore size than this stated range may be implemented within this stated range.

FIG. 1 is a system 100 for removing sulfur compounds from a gas. In implementations, the system 100 can be labeled as a tail gas treatment (TGT) unit (e.g., Claus TGT unit) or a portion of the TGT unit.

The system 100 includes an NTP catalytic unit 102 that converts sulfur compounds into $SO_x$, and a quench tower 104 that absorbs the $SO_x$ into water. The NTP catalytic unit 102 includes an NTP reactor 106.

In operation, a feed gas 108 having sulfur compounds is fed to the NTP catalytic unit 102. The feed gas 108 may be SRU tail gas (e.g., Claus tail gas). Claus tail gas on a volume basis may have, for example, $N_2$ (40%-80%), $CO_2$ (0-50%), $H_2O$ (0-30%), and sulfur compounds (0.1%-5%).

The NTP catalytic unit 102 converts (oxidizes) the sulfur compounds (in the received feed gas 108) into $SO_x$. The oxidizing of the sulfur compounds may be both [1] by an oxidative reactive species generated by the NTP reactor 106 and [2] by a catalyst in the NTP catalytic unit 102.

The NTP catalytic unit 102 includes the NTP reactor 106 (e.g., a DBD reactor or other NTP reactor type) to place received oxidant 110 in a plasma (NTP) state to give the oxidative reactive species (from the oxidant 110) for oxidizing the sulfur compounds. The subjecting of the oxidant 110 to NTP may be characterized as activating the oxidant 110 (e.g., $H_2O$, $O_2$, air, etc.) to give the oxidative reactive species (e.g., OH, O, etc.) for oxidizing the sulfur compounds. The oxidative reactive species may also be labeled as activate species.

The NTP reactor 106 (which includes a vessel—a reactor vessel) has a configuration (a technique) to generate NTP, such as DBD, corona discharge, pulsed corona discharge, etc. The NTP reactor 106, if a DBD reactor, may include a vessel having a high voltage electrode and a low voltage electrode with an intervening dielectric material between the high voltage electrode and the low voltage electrode.

In some implementations (e.g., FIG. 4), the catalyst may be disposed in the NTP reactor 106. For disposition of catalyst in a DBD reactor, the catalyst may be situated between the high voltage electrode and the low voltage electrode. Thus, the catalyst may be situated in the plasma discharge zone for the gas plasma (NTP formed from gas) that exists between the electrodes in operation.

The oxidant 110 fed to the NTP catalytic unit 102 to the NTP reactor 106 may be, for example, $H_2O$, $O_2$, etc. In some cases, air or oxygen-enriched air can be fed to provide the $O_2$. If so, the air can be saturated or near saturated with $H_2O$ to provide the $H_2O$. For $H_2O$ as an example of the oxidant(s) 110, the corresponding oxidative reactive species generated/formed via placing the oxidant 110 in an NTP state may be OH. For $O_2$ as an example of the oxidant(s) 110, the corresponding oxidative reactive species generated/formed via placing the oxidant 110 in an NTP state may be elemental O and/or ozone $O_3$. Again, the oxidative reactive species may be utilized to oxidize the sulfur compounds into $SO_x$.

The oxidizing of the sulfur compounds by the oxidative reactive species may be assisted (promoted) with the catalyst in the NTP catalytic unit 102. Oxidizing catalyst(s) can be used in plasma or post plasma. As mentioned, the catalyst may be a single catalyst or physical mixture of different catalysts may be utilized to simultaneously catalyze different catalytic oxidation reactions (e.g., $H_2S$ oxidation, COS oxidation, etc.). The catalysts may be, for example, metal oxide-based catalysts (e.g., mixed cerium oxide-zirconium oxide-titanium oxide) and/or zeolite-based catalysts. The catalyst can be supported (having a catalyst support) or unsupported (not having a catalyst support).

As mentioned, in implementations (e.g., FIG. 4), the catalyst may be situated in the NTP reactor 106. If so, the NTP reactor 106 may be labeled as an NTP catalytic reactor.

The NTP reactor 106 receives both the feed gas 108 and the oxidant 110. The oxidizing of the sulfur compounds in the NTP reactor 106 (as an NTP catalytic reactor) with the catalyst in presence of generation of the oxidative reactive species can be labeled as a direct plasma oxidation.

In other implementations (e.g., FIG. 5), the catalyst may be disposed in a vessel (e.g., conduit) of the NTP catalytic unit 102. The vessel may be operationally disposed downstream and/or in parallel with the NTP reactor 106. In these implementations, the feed gas 106 is generally not fed to the NTP reactor 106. The oxidant 110 is fed to the NTP reactor 106. The vessel having the catalyst may receive the oxidative reactive species from the NTP reactor 106 and receive the feed gas 108. The feed gas 108 flows through the vessel (e.g., a conduit having a fixed bed of the catalyst). With the feed gas 108 flowing through the vessel across the catalyst and with the oxidative reactive species from the NTP reactor 106 injected into the flowing feed gas 108 in the vessel (e.g., conduit), the oxidizing of the sulfur compounds may occur in the vessel. Again, the oxidizing (converting of sulfur compounds in the feed gas 108) may occur via the catalyst disposed in the vessel and via the oxidative reactive species injected from the NTP reactor 106 into the vessel. This can be labeled as indirect plasma oxidation.

In either case of the aforementioned direct plasma oxidation or indirect plasma oxidation, the NTP catalytic unit discharges the treated feed gas as process gas 112. In operation, the NTP catalytic unit 102 discharges the process gas 112 to the quench tower 104. As indicated, the quench tower 104 may be employed to remove $SO_x$ from the process gas 112 by absorbing $SO_x$ (e.g., $SO_2$ and $SO_3$) into water in the tower 104. The majority (greater than 50 weight percent) of the $SO_x$ may be $SO_2$ and $SO_3$, e.g., due to their stability. Yet, the $SO_x$ can include other S/O ratios, e.g., sulfur monoxide (SO).

The process gas 112 discharged from the NTP catalytic unit 102 may be labeled as process gas in having the $SO_x$ generated in the NTP catalytic unit 102. The process gas 112 may also have $SO_x$ that entered the NTP catalytic unit 102 in the feed gas 108. The process gas 112 may generally be the feed gas 108 having the $SO_x$ formed from the sulfur compounds in the NTP catalytic unit 102. In particular, the process gas 112 may be the feed gas 108 (e.g., SRU tail gas) minus the sulfur compounds oxidized into $SO_x$ in the NTP catalytic unit 102 plus (and having) the $SO_x$ formed by oxidizing the sulfur compounds in the NTP catalytic unit 102. For implementations (e.g., FIG. 5) in which the feed gas 108 flows through the NTP reactor 106 (a catalytic reactor in these implementations), the feed gas 108 in the process gas 112 may be the feed gas 108 as subjected to NTP in the NTP reactor 106.

In implementations, the $SO_x$ in the process gas 112 may be more $SO_2$ than $SO_3$. This processed tail gas discharged from the plasma catalytic unit may typically have more $SO_2$ than $SO_3$. Typically, as mentioned, the $SO_x$ is primarily $SO_2$ and $SO_3$ but other $SO_x$ forms may be formed. Moreover, ionized form of $SO_x$ could exist due to plasma. An issue or question can be stability in that are respective sulfur oxide forms adequately stable to exist in the plasma reactor and reach the quench tower 104.

The process gas 112 may enter a lower portion of the quench tower 104 and flow upward through the quench tower 104. See, for example, FIG. 2. Liquid water (e.g., acidic water) may flow downward through the quench tower and absorb $SO_x$ from the process gas 112. The $SO_2$ absorbed may give the water as dilute aqueous sulfurous acid. Thus, as mentioned, the water may be acidic water. The $SO_3$ in the process gas 112 may typically be a relatively small amount in comparison to $SO_2$. The $SO_3$ absorbed into the water in the quench tower 104 may give hydronium ions ($H_3O^+$), hydrogen sulfate ions ($HSO_4^-$), and sulfate ions ($SO_4^{2-}$) in the water.

The quench tower 104 may be a column or vessel having a vertical orientation. Internals in the vessel may include packing or trays to provide for increased contact of the process gas 112 flowing upward with liquid water (e.g., dilute aqueous acid) flowing downward in the tower 104.

The process gas 112 without the $SO_x$ absorbed into the water may discharge as overhead gas 114 from the quench tower 104. The overhead gas 114 may be labeled as clean gas in having little or no $SO_x$. The overhead gas 114 discharged from the quench tower may have, for example, less than 200 part per million by volume (ppmv) of $SO_x$ or less than 100 ppmv of $SO_x$, and less than 200 ppmv (or less than 100 ppmv) of sulfur compounds. In implementations, the overhead gas 114 generally does not include the water vapor in the process gas 112 that condensed in the quench tower 104. The water (in the quench tower 104 and as discharged from the quench tower 104) having the $SO_x$ as absorbed may be acidic water.

The overhead gas 114 may include $CO_2$ and nitrogen ($N_2$). The overhead gas 114 can be discharged to atmosphere or to a $CO_2$ capturing unit (e.g., employing adsorption/absorption, membrane, or cryogenic-based unit). The overhead gas 114 may be mainly $CO_2$ and $N_2$, and hence $CO_2$ may be readily captured in implementations. The combined amount of $CO_2$ and $N_2$ may be, for example, at least 70 volume percent (vol %), at least 80 vol %, or at least 90 vol %. The overhead gas 114 may have trace (residual) $O_2$. The overhead gas 114 may have trace amounts of $SO_x$, such as less than 50 ppmv, less than 20 ppmv, less than 10 ppmv, less than 5 ppmv, or less than 1 ppmv. The overhead gas 114 may have trace amounts of sulfur compounds, such as less than 50 ppmv, less than 20 ppmv, less than 10 ppmv, less than 5 ppmv, or less than 1 ppmv.

The water (acidic water) having the absorbed $SO_x$ may discharge as a bottom stream 116 from the quench tower 104. A portion of the acidic water discharged from the bottom portion of the quench tower 104 may be recycled to an upper portion of the quench tower 104 to give the water that flows downward through the tower 104. Makeup water 118 can be added. The bottom stream 116 (acidic water) as discharged can be processed downstream to remove dissolved gases (e.g., $SO_x$ including $SO_2$ in particular) to give water that is clean or less acidic. The makeup water 118 can be or include this treated acidic water and/or fresh water.

Figure 2:
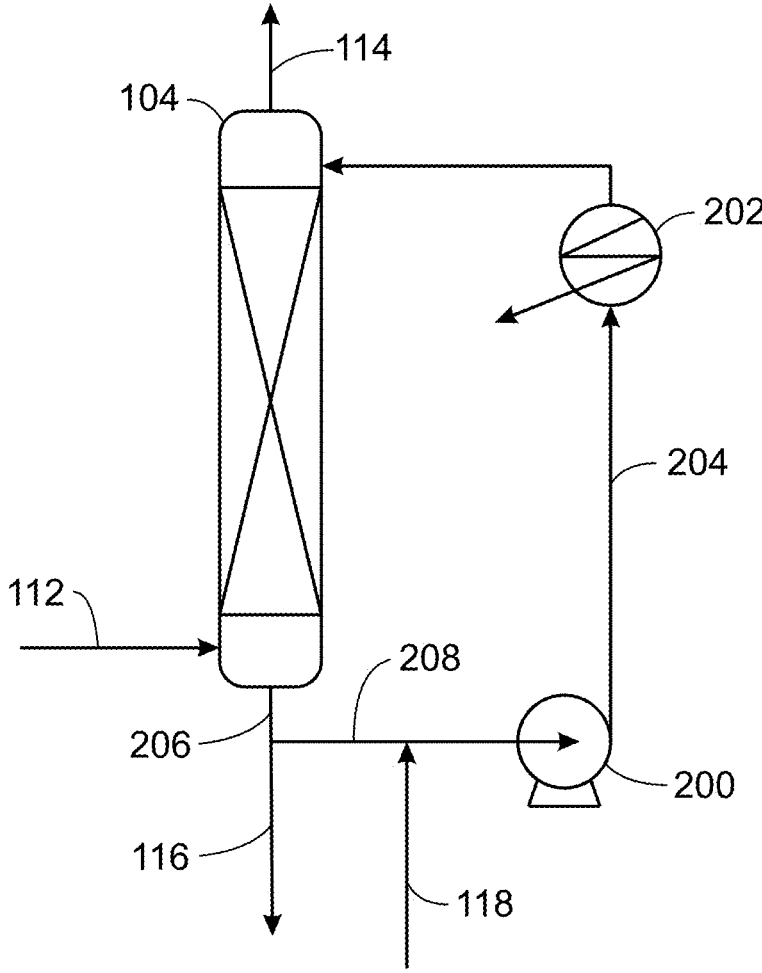
FIG. 2 is a diagram of an example of the quench tower of FIG. 1 with associated pump and cooler heat exchanger.

FIG. 2 is an example of the quench tower 104 with associated pump 200 (e.g., centrifugal pump) and cooler 202 heat exchanger. Again, the quench tower 104 may be a vertical vessel having packing or trays. In operation, the process gas 112 discharged from the NTP catalytic unit 102 (FIG. 1) may enter a lower portion of the quench tower 104. The process gas 112 may flow upward through the quench tower 104 in a counter current flow direction with respect to water 204 (liquid water) flowing downward through quench tower 104. The flowing water may absorb $SO_x$ from the process gas 112 flowing upward, and thus remove $SO_x$ from the process gas 112. The process gas 112 minus the removed $SO_x$ may discharge overhead from the quench tower 104 as overhead gas 114. The overhead gas 114 may include, for example, $CO_2$ and $N_2$. The overhead gas 114 can be discharged to the environment (to atmosphere) or can be subjected processing, such as processing to capture the $CO_2$.

The water 206 (acidic water) may discharge from a bottom part of the quench tower 104 to give the bottoms stream 116 discharged. The water 206 discharged from the quench tower 104 may be the water 204 plus the absorbed $SO_2$ and plus any water vapor in the process gas 112 that would be condensed in the tower 104. A portion 208 of the acidic water 206 discharged from the bottom part of the quench tower 104 may be recirculated via the pump 200 (and recirculation conduit) to the upper portion of the quench tower 104. The bottoms stream 116 may be the water 206 discharged from the quench tower 104 minus the water 208 recirculated. Makeup water 118 can be added to (combined with) the recirculated water 208 to give the total water 204 (may be labeled as quench water) that enters the quench tower 104 and flows downward in the quench tower 104 to absorb $SO_x$ from the process gas 112. In the recirculation, the water 204 may flow through the cooler 202 (e.g., shell-and tube heat exchanger, plate-fin heat exchanger, etc.) that utilizes a cooling medium (e.g., cooling water, air, etc.) to cool (reduce the temperature of) the water 204. The water 204 may discharge from the cooler 202, for example, at 60° C. or less, 40° C. or less, or in a range of 30° C. to 70° C., and enter the upper portion of the quench tower 104.

In the illustrated implementation, the addition point of the makeup water 118 is shown at the suction of the pump 200 (e.g., to a suction conduit of the pump 200). However, other addition points for the make water 118 to the quench tower 104 system are applicable. For example, the makeup water 118 may added downstream of the pump 200 or directly to the quench tower 104. The makeup water 118 may make up for water removed from the quenching system in the bottom stream 116.

The makeup water 118 is less acidic than the water 206/208 that discharges from the tower 104. Therefore, the water 204 that enters the quench tower 104 is less acidic than the water 206/208/116 discharged from the bottom portion of the tower 104. As indicated, the water 204 from the cooler 202 may enter the upper portion of the quench tower 104 and flow downward in a counter current direction with respect to the process gas 112 flowing upward through the quench tower 104. Again, the water 204 can be labeled as quench water.

In summary, the quench tower 104 may be operationally coupled to the NTP catalytic unit 102 (FIG. 1) to receive process gas 112 discharged from the NTP catalytic unit 102 and absorb $SO_x$ from the process gas 112 into water. The quench tower 104 may discharge the overhead gas 114 including the process gas 112 (without the $SO_x$ absorbed into the water) and discharge the bottoms stream 116 including the water having the $SO_x$ as absorbed.

Figure 3:
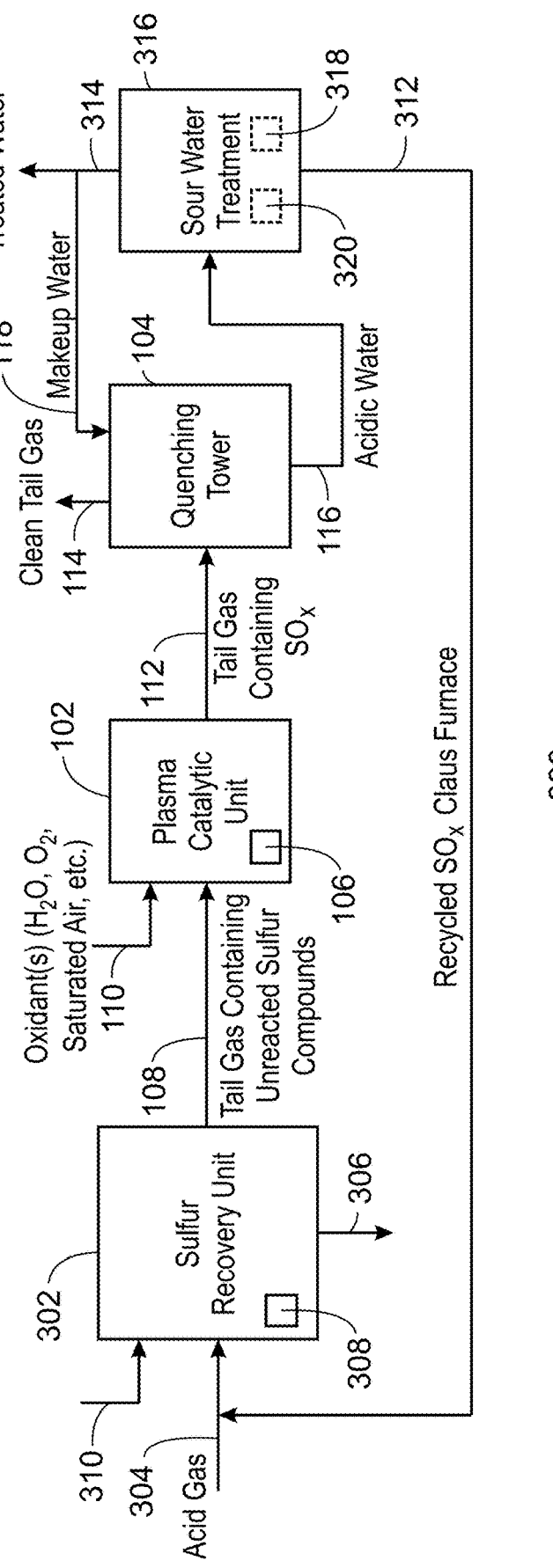
FIG. 3 is a diagram of a system for removing sulfur compounds from a gas.

FIG. 3 is a system 300 for removing sulfur compounds from a gas. The system includes an SRU 302 (e.g., Claus system) and the system 100 (e.g., TGT unit) of FIG. 1 having the NTP catalytic unit 102 and quench tower 104. In operation, the SRU 302 may receive a gas 304 having sulfur compounds and remove sulfur compounds to give a gas 108 (e.g., SRU tail gas) having less amount of sulfur compounds than the feed gas 304. The SRU 302 may convert sulfur compounds to elemental sulfur 306 for recovery. See FIG. 11 for an example of an SRU 302. The stream 306 may be liquid elemental sulfur discharged in combination from multiple condenser heat exchangers in the SRU 302.

In implementations, the received (fed) gas 304 may be acid gas having at least $H_2S$ as a sulfur compound and having $CO_2$. The gas 304 may be fed to a furnace 308 (e.g., Claus reaction furnace) of the SRU 302. Again, the SRU 302 may remove sulfur compounds from the gas 304 and discharge the gas 108 having residual sulfur compounds. In the illustrated implementation, the gas 108 may be SRU tail gas (e.g., Claus tail gas). The SRU 302 may discharge the gas 108 to the system 100 (FIG. 1) as a TGT unit having the NTP catalytic unit 102 and the quench tower 104.

Air 310 (for $O_2$) may be fed to the furnace 308. Fuel gas (e.g., natural gas, methane, etc.) may also be fed to the furnace 308 for combustion to facilitate pressure control (e.g., maintain operating pressure at set point or in a specified range) in the furnace 308.

The $O_2$ from the air 310 may be consumed in the combustion in the furnace 308. The $N_2$ from the air 310 may flow through the system 300 and discharge in the overhead gas 114. In implementations, the air 310 is oxygen enriched air (OEA) and thus having less $N_2$. An air separation unit (ASU) may be employed to remove nitrogen ($N_2$) gas from the air fed to the SRU furnace 308 so that the air 310 is OEA and thus the SRU 302 beneficially sends less $N_2$ (in the SRU tail gas 108) to the downstream NTP catalytic unit 102.

An SRU may be an important process unit in (or associated with) natural gas processing plants or petroleum refineries, not only for sulfur production (e.g., 306) but also for abatement of hydrogen sulfide ($H_2S$) gas. As sulfur emissions regulations become more stringent, refineries and gas processors benefit from a cost-effective solution to the sulfur dioxide ($SO_2$) emission problem. The current World Bank standards prescribe that sulfur oxides ($SO_x$) emissions (products of $H_2S$ combustion) should be limited to less than 150 mg/Nm$^3$ $SO_2$ at stack (dry basis no oxygen). For streams having residual $H_2S$ that are sent to a flare or thermal oxidizer, the $H_2S$ is converted to $SO_2$ in the flare or thermal oxidizer and may be emitted to the environment from the flare stack or thermal oxidizer.

Typical Claus SRUs have a limited sulfur recovery of 95 to 98% (depending on the number of catalytic stages used) due to thermodynamic limitation. Therefore, a tail gas treatment (TGT) (unit, process, system) may be implemented after the Claus main SRU (e.g., SRU 302). The most widely used TGT is based on amine absorption, where sulfur-containing gases are converted to $H_2S$ then fed to amine process for selective capture and recycle of $H_2S$ back to Claus furnace. The amine-based TGT process is generally complicated, energy intensive, and expensive due at least to amine regeneration and recirculation, $CO_2$ slippage, and amine losses.

Conversely, embodiments herein relate to plasma-based techniques to treat gases having sulfur compounds, such as in a TGT unit (e.g., 100 of FIG. 1) that receives SRU 302 (e.g., Claus) tail gas 108.

In an SRU 302 as a Claus system, feed gas 304 (e.g., acid gas or having $H_2S$ as an acid gas) is fed to a furnace 308 (e.g., Claus furnace). An oxidation reaction in the furnace 308 (e.g., reaction furnace or thermal reactor in thermal stage of Claus system) is $2H_2S+3O_2{\rightarrow}2SO_2+2H_2O$, which is the oxidation of the entering $H_2S$ from the fed acid gas with fed oxygen ($O_2$) gas (e.g., from fed air 310) to give $SO_2$ and $H_2O$ vapor. The reaction furnace 308 as a thermal reactor may also perform the Claus reaction $2H_2S+SO_2{\rightarrow}3S+2H_2O$, in which $H_2S$ gas and $SO_2$ react to give elemental S gas and $H_2O$ vapor. An overall reaction involving these two reactions (oxidation reaction and Claus reaction) in the furnace 308 may be characterized as $2H2S+O_2{\rightarrow}2S+2H_2O$ for the Claus thermal stage. In the Claus catalytic stage downstream for the Claus thermal stage, the Claus reaction $2H2S+SO_2{\rightarrow}3S+2H_2O$ may also be performed (as a catalytic reaction) in Claus catalytic converters (catalytic reactors) downstream of the furnace 308.

The Claus system generally is the most significant (prevalent) gas desulfurizing process, recovering elemental sulfur from gaseous hydrogen sulfide. The multi-step Claus system recovers elemental sulfur from the gaseous hydrogen sulfide found in raw natural gas and from the by-product gases containing hydrogen sulfide derived from refining crude oil and other industrial processes.

In brief, the Claus system can be divided into at least two process steps (sections), thermal and catalytic steps. In the thermal step, air (optionally plus fuel gas) and acid gas (having $H_2S$) are fed to reaction furnace (Claus furnace), and the $H_2S$ reacts in combustion (e.g., sub-stoichiometric combustion) at temperatures above 850° C. $H_2S$ is converted to elemental sulfur in Claus SRU via the two reactions (R18, R19) below. In implementations, 50% to 70% (or 60% to 70%) of the total amount of elemental sulfur produced in the SRU (Claus system) can be obtained in the thermal step (furnace 308).

$$2H_2S+3O_2 \rightarrow 2SO_2+2H_2O \qquad (R18)$$

$$2H_2S+SO_2 \rightarrow S+2H_2O \qquad (R19)$$

In the catalytic step (section), the catalyst (e.g., activated aluminum (III) or titanium (IV) oxide) is utilized in catalytic reactors (catalytic converters) to boost the sulfur yield. In the catalytic converters, more $H_2S$ reacts with the $SO_2$ formed during combustion in the reaction furnace 308, and results in gaseous elemental sulfur. Up to 98% of sulfur can be recovered via the SRU 302.

The configuration and operation of the NTP catalytic unit 102 and the quench tower 104 may be as discussed with respect to FIGS. 1-2. The NTP catalytic unit 102 includes an NTP reactor 106 to oxidize sulfur compounds into $SO_x$. The NTP catalytic unit 102 may be operationally coupled (as depicted in FIG. 3) to the SRU 302 to receive the gas 108 (e.g., SRU tail gas) having sulfur compounds discharged from the SRU 302. The NTP catalytic unit 102 may oxidize the sulfur compounds via a catalyst (in the NTP unit 102) and an oxidative reactive species (generated or formed in the NTP catalytic unit 102) into $SO_x$. The NTP catalytic unit 102 includes the NTP reactor 106 to receive an oxidant 110 and place the oxidant 110 in an NTP state to give the oxidative reactive species formed from the oxidant 110.

The bottoms stream 116 (acidic water) discharged from the quench tower 104 can be processed to remove $SO_x$ 312 to give treated water 314. For example, a distillation column, stripper column vessel, or a membrane degassing unit (can also be labeled as membrane stripping unit) may be employed to remove the $SO_x$ 312 from the bottoms stream 116 to give the treated water 314. The treated water 314 may include the bottoms stream 116 minus the $SO_x$ 312 removed. If a distillation column is employed, the distillation column may be, for example, a distillation column having a steam reboiler to remove the $SO_x$ from the bottoms stream 116 to give the $SO_x$ 312 and the treated water 314. If a stripper column is employed, the stripper column may utilize a stripping agent (e.g. $N_2$, air, etc.) in a counter current flow direction with the bottoms stream 116 to remove (strip or absorb into the stripping agent) the $SO_x$ 312 from the bottoms stream 116 to give the treated water 314. For a membrane degassing unit, see the discussion associated with FIGS. 9-10 for examples of membrane degassing units that remove $SO_x$ 312 from the bottoms stream 116 to give the treated water 314. Whether a distillation column, stripper column, or membrane degassing unit is employed, the treated water 314 may be or include the bottoms stream 116 minus the removed $SO_x$ 312. At least a portion (a portion or all) of the treated water 314 may be utilized as the makeup water 118 for the quench tower 104. Any remaining portion of the treated water 314 may be utilized for other uses or disposed (e.g., sent to sewer). In implementations, the $SO_x$ 312 removed from the bottoms stream 116 (acid water) may be sent (recycled) to the furnace 308. For instance, the $SO_x$ 312 may be added to the feed gas 304.

While a sour water treatment system 316 is depicted as providing processing to remove $SO_x$ 312 from the bottom stream 116 to give treated water 114, other techniques or systems for such processing are applicable The system 300 may include or be associated with a sour water treatment system 316. In other implementations, the system 300 may utilize a membrane degassing unit (having a membrane) instead of the sour water treatment system 316. In yet other implementations, the sour water treatment system 316 may include the membrane degassing unit 318.

For examples of a membrane degassing unit, either as part of a sour water treatment system 316 as depicted, or as separate from a sour treatment system 312 and dedicated to (e.g., part of) the system 300, see FIGS. 9-10. In implementations, the bottoms stream 116 may discharge from the quench tower 104 to the sour water treatment system 316 (unit or plant), or to a membrane degassing unit outside of a sour water treatment system 316 or not associated with a sour water treatment system 316. A membrane degassing unit (e.g., FIGS. 9-10) can remove $SO_x$ 312 from the bottoms stream 116 and give the treated water 314.

In certain implementations, the sour water treatment system 316 may receive sour water (water having $H_2S$) from multiple sources or providers and remove $H_2S$ from the sour water and give treated water 314. For example, the sour water treatment system 316 may include a stripper column 320 vessel to remove $H_2S$ from sour water. In certain implementations, the stripper column may utilize a stripping agent (e.g., nitrogen, air, noble gases, natural gas, fuel gas, methane, etc.) in a counter current flow direction with the sour water to remove (strip or absorb into the stripping agent) $H_2S$ from the sour water to give treated water 314. The sour water treatment system 316 may be additionally configured to remove $SO_x$ from the bottoms stream 116 to give treated water 314. If such a sour water treatment system is employed, the treated water 314 can include both treated water recovered from sour water and treated water recovered from acidic water having $SO_x$.

Embodiments of the disclosed process utilize NTP in conjunction with catalyst(s) to oxidize sulfur compounds (e.g., $H_2S$, COS, $CS_2$, $CH_3SH$, S, etc.) in the tail gas streams to $SO_x$ gases (and oxidize CO to $CO_2$), and then utilize liquid water to remove $SO_x$ gases from the tail gas stream via absorption. The resulting acidic water may be sent to a water treatment unit to remove the $SO_x$ from the water to give water as clean or less acidic. In contrast to a conventional thermal oxidizer that consumes fuel and emits $CO_2$, plasma (NTP) oxidation uses electrical power. The electrical power can be generated from renewable energy sources, such as solar-generated energy or wind-generated energy. The disclosed NTP catalytic/quench tower process can handle the presence of other gases in the feed, such as water vapor, nitrogen ($N_2$), hydrocarbons, and other contaminants that are typically present in tail gas streams.

The plasma catalytic unit can be single unit or a multi-stage unit where multiple plasma catalytic units are employed in series with the same or different parameters (e.g., frequency, voltage, residence time, etc.). Operating pressure of the NTP reactor can range, for example, from 1 bar to 5 bar, depending on the type of NTP. In examples, the NTP reactor is operated between 150 and 250° C. to keep the temperature below 300° C. to avoid or reduce sulfur deposition on the catalyst in the NTP catalytic reactor or in a coupled vessel (e.g., 504 in FIG. 5) having the catalyst. However, the operating temperature of the NTP reactor (including NTP catalytic reactor) can range from 30° C. to 800° C.

A single catalyst, bifunctional catalyst, and/or physical mixture of different catalysts are used to simultaneously catalyze different catalytic oxidation reactions and/or enhance plasma properties. The catalysts can be, but not limited to, supported or unsupported metal oxide-based catalysts (e.g., mixed cerium-zirconium-titanium oxide) and/or zeolite-based catalysts. For implementations with the catalyst in the NTP reactor, the solid catalyst(s) may be placed fully or partially in the plasma discharge zone (in-plasma catalysis) or downstream of the plasma discharge zone (post-plasma catalysis).

The plasma catalytic oxidation unit (NTP catalytic unit) can employ a direct oxidation method (all of the gas [tail gas+oxidant(s)] is processed through the plasma) or indirect oxidation method (a smaller stream [oxidant(s)] is processed/activated through the plasma and then injected into the main tail gas stream outside of the plasma). Moreover, the oxidant(s) (e.g. $H_2O$ or $O_2$) used to oxidized sulfur compounds to $SO_x$ may coexist in the tail gas or can be added to the tail gas. The feeding of the oxidant(s) is to promote sufficient oxidation of the sulfur compounds into $SO_x$ (and oxidation of any CO into $CO_2$). Plasma high voltage for the NTP reactor can range, for example, from 1 kV to 50 kV with a frequency ranging from lower radio frequency (RF) to microwave frequencies.

A membrane-based degassing ($SO_x$ stripping) system/process may be integrated with the NTP unit/quench tower to treat acidic water discharged from the quench tower. The membrane-based degassing unit removes $SO_x$ from the acidic water to give treated water that is the acidic water without the $SO_x$ removed and thus is less acidic than the acidic water. In implementations, the treated water can be sent as makeup water for the quench tower. Greater sulfur recovery levels for the overall system can be achieved by increasing the wash water recirculation rate in the membrane-based degassing unit, such that $SO_x$ in the treated water can be reduced to less than 200 ppmv. Moreover, for removing $SO_x$ from water, in employing a membrane-based degassing unit instead of a conventional steam-reboiled distillation column, stripping energy consumption can be significantly reduced.

FIG. 4 is an NTP catalytic unit 400 having an NTP catalytic reactor 402. The configuration can be characterized as providing for direct oxidation in that the oxidizing of sulfur compounds into $SO_x$ is performed in the NTP reactor 402. The NTP reactor 402 may be a DBD reactor or other type of NTP reactor. The NTP catalytic unit 400 and its NTP reactor 402 may be analogous to NTP catalytic unit 102 and NTP reactor 106, respectively, of FIGS. 1 and 3.

In operation, the NTP reactor 402 receives gas 108 having sulfur compounds. The gas 108 may be SRU tail gas (e.g., Claus tail gas) discharged from the SRU 302 (e.g., Claus system) of FIG. 3. Oxidant(s) 110 (see FIGS. 1 and 3), such as $H_2O$, $O_2$, air (e.g., having water moisture), etc. may be fed to the NTP reactor 402. Some or all of the oxidant(s) 110 may be may be in the feed gas 108. If all of the oxidant(s) 110 (and the desired amount) is in the gas 108, then a separate stream of oxidant(s) 110 is not fed to the NTP reactor 402.

The NTP reactor 402 places the gas 108 [including any oxidants(s) 110] and any oxidant(s) added in an NTP state in a plasma discharge zone 404 of the NTP reactor. For the example of the NTP reactor 402 as a DBD reactor, a plasma discharge zone (as discussed) is between the high voltage electrode(s) and the low voltage electrode. The oxidant(s) 110 (and the gas 108 generally) flowing through the NTP reactor 402 is placed into the NTP state in the plasma discharge zone 404. The subjecting of the oxidant(s) 110 to the NTP state generates (forms) oxidative reactive species (e.g., OH, O, $O_3$, etc.) from the oxidant(s) 110. The oxidative reactive species oxidizes sulfur compounds in the gas 108 into $SO_x$ in the plasma discharge zone 404 (and downstream of the plasma discharge zone 404, as long as the generated oxidative reactive species exist).

The NTP reactor 402 includes catalyst and thus is an NTP catalytic reactor 402. The NTP is combined with catalyst and thus may be labeled as NTP catalysis. Some or all of the catalyst (e.g., solid catalyst in a fixed bed of the catalyst) may be disposed in the plasma discharge zone 404 of the NTP reactor 402 (e.g., for plasma catalysis). The oxidizing of the sulfur compounds by the oxidative reactive species may be facilitated (assisted, promoted, advanced) with the catalyst in the NTP catalytic reactor 402. Some of the catalyst can be in the reactor 402 downstream of the plasma discharge zone 404 to give post-plasma catalysis in which oxidative reactive species flow in the reactor 402 downstream of the plasma discharge zone 404.

A process gas 112 (e.g., as discussed above with respect to FIGS. 1 and 3) may discharge from the NTP catalytic reactor 402 (and thus from the NTP catalytic unit 400), such as to the quench tower 104 (FIGS. 1 and 3). The NTP catalytic reactor 402 may discharge the gas 108 treated in the reactor 402 as process gas 112. The gas 112 discharged from the NTP catalytic unit 402 may be labeled as process gas in having the $SO_x$ generated in the NTP catalytic reactor 402. The process gas 112 may also have $SO_x$ that entered the NTP catalytic reactor 402 in the gas 108. In implementations, the $SO_x$ in the process gas 112 may be absorbed into water in a downstream quench tower 104.

The NTP catalytic reactor 402 may also oxidize CO (if present in the entering gas 108) via the oxidative reactive species and the catalyst into $CO_2$. In this case, the process gas 112 may include the $CO_2$ so generated in the NTP catalytic reactor 402.

FIG. 5 is an NTP catalytic unit 500 having an NTP reactor 502 (not an NTP catalytic reactor) and a vessel 504. The configuration can be characterized as providing for indirect oxidation in that the oxidizing of sulfur compounds into $SO_x$ is performed outside of the NTP reactor 502 in the vessel 504. The oxidative reactor species generated in the NTP reactor 502 for oxidizing the sulfur compounds is (are) injected into the vessel 504 from the NTP reactor 502 via a conduit 506 coupling the NTP reactor to the vessel 504. The vessel 504 may also be a conduit.

In the illustrated implementation, the NTP reactor 502 does not have catalyst. Instead, the vessel 504 (e.g., a conduit) includes catalyst 508. The NTP reactor 502 may be a DBD reactor or other type of NTP reactor. The NTP catalytic unit 500 and its NTP reactor 502 may be analogous to NTP catalytic unit 102 and NTP reactor 106, respectively, of FIGS. 1 and 3.

In operation, oxidant(s) 110 (e.g., $H_2O$, $O_2$, air, etc.) are fed to the NTP reactor 502. The NTP reactor 502 places the oxidants(s) 110 flowing through the NTP reactor 502 into an NTP state in a plasma discharge zone of the NTP reactor 502 to give oxidative reactive species (e.g., OH, O, $O_3$, etc.). For the example of the NTP reactor 502 as a DBD reactor, a plasma discharge zone (as discussed) is between the high voltage electrode(s) and the low voltage electrode. The subjecting of the oxidant(s) 110 to the NTP state generates (forms) oxidative reactive species (e.g., OH, O, $O_3$, etc.) from the oxidant(s) 110. The oxidative reactive species flow(s) from the NTP reactor 502 via the conduit 506 to the vessel 504.

A gas 108 having sulfur compounds flows through the vessel 504. The gas 108 may be SRU tail gas (e.g., Claus tail gas) discharged from the SRU 302 (e.g., Claus system) of FIG. 3. The oxidative reactive species from the NTP reactor 502 oxidizes sulfur compounds of the gas 108 in the vessel 504 into $SO_x$. The catalyst 508 (e.g., fixed bed) in the vessel 504 may assist (promote) the oxidizing of sulfur compounds with the oxidative reactive species into $SO_x$. Again, sulfur compounds in the gas 108 so oxidized may include $H_2S$, S vapor, COS, $CS_2$, $CH_3SH$, etc.

The process gas 112 (e.g., as similarly discussed with respect to FIGS. 1 and 3-4) may discharge from the vessel 504 (and thus from the NTP catalytic unit 500), such as to a quench tower 104 (FIGS. 1 and 3). The NTP catalytic unit 500 may discharge the gas 108 treated (via the catalyst in the vessel 504 with oxidative reactive species from the reactor 502) as process gas 112. The gas 112 discharged from vessel 504 (and thus from the NTP catalytic unit 500) may be labeled as process gas in having the $SO_x$ generated in the vessel 504. The process gas 112 may also have $SO_x$ that entered the vessel 504 in the gas 108. The $SO_x$ in the process gas 112 may be absorbed into water in a downstream quench tower 104.

The NTP catalytic unit 500 may also oxidize CO (if present in the entering gas 108) via the oxidative reactive species (from the reactor 502) and the catalyst 508 in the vessel 504 into $CO_2$. The process gas 112 may include the $CO_2$ so generated in the vessel 504.

Embodiments may include an NTP catalytic unit operationally coupled to a SRU to receive SRU tail gas (having sulfur compounds) discharged from the SRU and oxidize the sulfur compounds via a catalyst and an oxidative reactive species into $SO_x$. The NTP catalytic unit has an NTP reactor to receive an oxidant and place the oxidant in an NTP state to give the oxidative reactive species formed from the oxidant.

In implementations (e.g., FIG. 4), the NTP reactor includes the catalyst to receive the SRU tail gas to oxidize the sulfur compounds with the oxidative reactive species and the catalyst in the NTP reactor (as an NTP catalytic reactor). At least a portion of the catalyst is disposed in a plasma discharge zone of the NTP catalytic reactor.

In implementations (FIG. 5), the NTP catalytic unit includes a vessel having the catalyst to receive the SRU tail gas from the SRU and the oxidative reactive species from the NTP reactor and oxidize the sulfur compounds with the catalyst and the oxidative reactive species in the vessel. The vessel is not the NTP reactor. The NTP catalytic unit may include a conduit coupling the vessel to the NTP reactor for the oxidative reactive species to flow from the NTP reactor through the conduit to the vessel. The vessel may also be a conduit. Thus, in implementations, the conduit that conveys the oxidative reactive species from the NTP reactor to the vessel may be labeled as a first conduit, and the vessel labeled as a second conduit.

The catalyst as discussed with respect to the NTP catalytic unit of FIGS. 1 and 3-5 (and with respect to the NTP catalytic reactors of FIGS. 6-8) may be labeled as an oxidizing catalyst or oxidation catalyst, and as indicated, may be a single catalyst or physical mixture of different catalysts. The catalysts may be, for example, metal oxide-based catalysts (e.g., mixed cerium oxide-zirconium oxide-titanium oxide) and/or zeolite-based catalysts. The catalyst can be supported or unsupported. The catalyst can metal-based catalysts (e.g., metal includes iron), metal oxide-based catalyst (e.g., iron oxide), metal sulfide-based catalyst (e.g., molybdenum sulfide), or zeolite-based catalyst (microporous aluminosilicate) (e.g., H-ZSM-5), or any combinations thereof. Again, these catalysts can be supported or unsupported. Examples include molybdenum sulfide ($MoS_2$) supported on alumina, cadmium sulfide (CdS) supported on alumina, zinc sulfide (ZnS) supported on alumina, Zeolite Socony Mobil-5 (ZSM-5) in the H form (H-ZSM-5), etc. ZSM-5 is an aluminosilicate zeolite belonging to the pentasil family of zeolites. Its chemical formula is $Na_nAl_nSi_{96-n}$ $O_{192} \cdot 16H_2O$ (0<n<27). An example is a physical mixture of $MoS_2$ (supported on $ZrO_2$) and H-ZSM-5.

FIGS. 6-8 are examples of an NTP reactor as a DBD reactor, and may be analogous to the NTP reactor 106 of FIGS. 1 and 3. In each of FIGS. 6-8, the NTP reactor as a DBD reactor can include catalyst for promoting oxidizing of sulfur compounds into $SO_x$, and oxidizing CO into $CO_2$. If so, the DBD reactor may be a DBD packed-bed reactor having a packed bed of the catalyst. In operation, the NTP reactor (DBD reactor) with catalyst may receive both [1] gas 108 (e.g., SRU tail gas) having sulfur compounds and [2] oxidant(s) 110, and may be analogous to the NTP reactor 402 of FIG. 4. For other implementations in each of FIGS. 6-8, the NTP reactor as a DBD reactor does not include catalyst and, in operation, receives oxidant(s) 110, and may be analogous to the NTP reactor 502 of FIG. 5.

FIG. 6 is an NTP reactor 600 that is a DBD reactor. The reactor 600 may be analogous to the NTP reactors of FIGS. 1 and 3-5. The reactor 600 may have catalyst, as depicted (for oxidation of sulfur compounds and CO). If so, the reactor 600 may be labeled as an NTP catalytic reactor and may be a DBD packed-bed reactor. In other implementations, the reactor 600 does not have catalyst and is a DBD reactor without catalyst. FIG. 6 is a representation of an approximate cross-section of the NTP reactor 600 that is a DBD reactor. The reactor 600 includes a cylindrical dielectric material 602 defining an inside volume of the reactor 600. The inside diameter of the dielectric material 602 is the diameter of the inside volume of the reactor 600. A cylindrical low voltage electrode 604 (grounded) radially surrounds an axial length portion of the dielectric material 602. The two open axial ends of the dielectric material 602 are sealed (covered, closed) with conduit fittings 606, 608. The inlet conduit fitting 606 closes the inlet end of the dielectric material 602 cylinder. The outlet conduit fitting 608 closes the outlet end of the dielectric material 602 cylinder. Catalyst is disposed in the reactor 600, such as in the inside volume of the reactor 600 defined by the dielectric material 602. The catalyst (if present as depicted) may be catalyst pellets but more generally may be catalyst particles that are spherical or irregular shape, or other shape. Moreover, the simplified representation of particle size of the catalyst relative to the reactor 600 size may be smaller than depicted. A high-voltage bar, wire, or rod electrode 610 is situated in the inside volume of the reactor 600, and can run through the catalyst in implementations. The dielectric material 602 situated between the two electrodes 604, 610 gives a DBD configuration. A high-voltage cable 612 (e.g., wire with protective cable coating) may supply the voltage from a power supply to the electrode 610. The rod electrode 610 may be characterized as the high-voltage electrode. The cable 612 or rod electrode 610, or both, can be routed, for example, through the inlet conduit fitting. The voltage may be, for example, in the range of 1 kilovolt (kV) to 50 kV, and with a frequency ranging from radio frequency (RF) to microwave frequencies. The numerical range for the high voltage supplied to the reactor 600 (DBD unit) may depend on the frequency utilized and on the geometry of the reactor, such as the gap between the high voltage and low voltage electrodes.

An inlet conduit 614 is routed through or coupled with the inlet conduit fitting 606. An outlet conduit 616 is routed through or coupled with the outlet conduit fitting 608. In operation, a gas introduced via the inlet conduit 614 may flow through the inlet conduit 614 into the reactor 600 where the gas is transitioned into a plasma state (NTP state). As the operation may be a continuous operation (and with the reactor 600 being a continuous reactor), the gas that flows through the reactor 600 discharges through the outlet conduit 616 (discharge conduit) from the reactor 600 as a discharge (treated) gas.

The gas that enters via inlet conduit 614 may include a combination of [1] gas 108 having sulfur compounds and [2] oxidants(s) 110 if the reactor 600 has catalyst as depicted. In this case, the discharge gas may be gas 112, as discussed, and sent, for example, to a quench tower 104 (FIGS. 1-3), such as via the outlet conduit 616.

The gas that enters via inlet conduit 614 may include oxidants(s) 110 (and not gas 108) if the reactor 600 does not have catalyst. In this case, the discharge gas may be oxidative reactive species sent to a vessel (e.g., 504 of FIG. 5) having catalyst in the NTP catalytic unit, such as discussed with respect to FIG. 5.

Again, the high voltage for the NTP reactor 600 may be received and applied by supplying electricity through coated wire 612 onto the exposed wire rod 610 inside the NTP reactor 600 (DBD-packed bed reactor having catalyst, or DBD reactor not having catalyst). The high voltage may be supplied to (and received at) the reactor 600 via the coated (insulated) wire 612 that is connected to the bare metallic rod 610 (inside the reactor 600) that acts as a high voltage electrode. The metallic rod 610 inside the reactor 600 can be exposed to the gas 108 and catalyst (if present) or covered by an additional dielectric material for a doubled DBD reactor.

FIG. 7 is an NTP reactor 700 that is a DBD reactor. The reactor 700 may be analogous to the NTP reactors of FIGS. 1 and 3-6. The reactor 700 may have catalyst, as depicted (for oxidation of sulfur compounds and CO). If so, the reactor 700 may be labeled as an NTP catalytic reactor and may be a DBD packed-bed reactor. In other implementations, the reactor 700 does not have catalyst and is a DBD reactor without catalyst. FIG. 7 is a representation of an approximate cross-section of the NTP reactor 700. If the reactor 700 includes the catalyst, the reactor 700 combines the plasma (NTP) process with a catalyst(s). FIG. 7 is a simplified schematic diagram of the NTP reactor 700 (DBD packed-bed reactor having a packed bed of the catalyst as depicted, or a DBD reactor without catalyst) with a high voltage electrode 610 (metal rod) and a grounding electrode 604. The electrode rod 610 is inserted in the center portion of the reactor 700. An electrical cable (not shown) may supply electricity at high voltage (e.g., 1-50 kV) from a power supply to the electrode 610. The grounding electrode 604 (e.g. aluminum foil or mesh) may wrap around the dielectric material 602 on an outside portion of the reactor 700. The two electrodes 604, 610 with the intervening dielectric material 602 provides for an NTP DBD process. In operation, the gas 701 entering the reactor 700 may be a plasma (NTP) in the inside volume of the reactor 700 between the two electrodes 604, 610.

The reactor 700 includes the cylindrical dielectric material 602 forming an inside volume of the reactor 700. In the illustrated implementation, the inside diameter of the dielectric material 602 gives the diameter of the inside volume of the reactor 700. The dielectric material 602 may be, for example, ceramic, glass, or non-conductive composite material, and the like. The cylindrical low voltage electrode 604 (grounded) radially surrounds an axial length portion of the cylindrical dielectric material 602. The grounding electrode 604 can be the geometry of foil, mesh, coil, cylindrical plate, tube, etc., and the grounding electrode 604 can be aluminum, copper, alloy, steel, etc.

In an alternative to the illustrated embodiment, the grounding (low voltage) electrode 604 can be a cylindrical steel conduit (tube) forming the inside volume of the reactor 700 (with no dielectric material 602 on the outside), and the dielectric material 602 covers the high voltage electrode 610 (metal rod). Thus, the discharge path (zone) for forming plasma (NTP) with the natural gas 104 would be the annulus between the dielectric material 602 and the low voltage electrode 604 (as a steel cylinder).

In the illustrated embodiment, the inlet axial end of the reactor 700 is coupled via a connection 702 to an inlet conduit 704 (pipe). The outlet axial end of the reactor 700 is coupled via a connection 706 to an outlet conduit 708 (pipe). The connections 702, 706 may be flanged, as depicted, or each can be a screwed connection (threaded), a welded connection, etc. In implementations, the inlet conduit 704 conveying gas 701 to the reactor 700 and the outlet conduit 708 conveying discharge (treated) gas 710 may be carbon steel or stainless steel (or other metal alloy), depending on the composition of the gas.

The gas 701 that enters via inlet conduit 704 may include a combination of [1] gas 108 having sulfur compounds and [2] oxidants(s) 110 if the reactor 700 has catalyst as depicted. In this case, the discharge gas 710 may be process gas 112, as discussed, and sent, for example, to a quench tower 104 (FIGS. 1-3), such as via the outlet conduit 708.

The gas 701 that enters via inlet conduit 614 may include oxidants(s) 110 (and not gas 108) if the reactor 700 does not have catalyst. In this case, the discharge gas 710 may be oxidative reactive species sent to a vessel having catalyst in the NTP catalytic unit, such as discussed with respect to FIG. 5.

As mentioned, catalyst may be disposed in the reactor 700, such as in the inside volume of the reactor 700 defined by the dielectric material 602. The catalyst may be solid catalyst particles or catalyst pellets, and the like, and may be the types of catalyst discussed. If catalyst is present, the DBD packed-bed reactor (having the packed bed of catalyst) is an NTP catalytic reactor that performs NTP catalysis. The operation with catalyst in the plasma discharge path (plasma discharge zone) between the electrodes may be characterized as in-plasma catalysis.

Lastly, in implementations, the reactor 700 may be insulated, or have a metal or plastic outer housing surrounding the grounding electrode 604 and dielectric material 602. The reactor 700 may be insulated for thermal reasons or for protection, or the reactor 700 hosted in a metal surrounding. In addition, the reactor 700 may configured such that water flows around the grounding electrode 604 to control the temperature around (exterior to) the plasma zone.

FIG. 8 is an NTP reactor 800 that is a DBD reactor. The reactor 800 may be analogous to the NTP reactors of FIGS.

1 and 3-5. The reactor 800 may have catalyst for oxidation of sulfur compounds and CO. If so, the reactor 800 may be labeled as an NTP catalytic reactor and may be a DBD packed-bed reactor. In other implementations, the reactor 800 does not have catalyst and is a DBD reactor without catalyst. FIG. 8 is a simplified representation of the NTP reactor 800 as a DBD reactor. Depicted are a side view 802 of the reactor 800 and an end view 804 of the reactor 800. The reactor 800 may have cylindrical outer housing or shell 806. The DBD reactor 800 may be multiple DBD cylindrical tubes 808 each similarly configured as in FIGS. 6-7 or otherwise configured to provide for DBD process. Plates or solid material 810 may be situated between the tubes 808 such that the entering gas, e.g., oxidant(s) 110+gas 108 having sulfur compounds, or oxidant(s) 110 only, as discussed with respect to preceding figures, flows through the tubes 808 and not around the tubes 808. In other words, in implementations, there may be no flow path for the gas on the shell side of the tubes 808. In implementations, a heat transfer fluid (e.g., cooling water for cooling, steam for heating, etc.) can flow on the shell side around the tubes 808.

Each cylindrical tube 808 may have a high voltage electrode, a low voltage (grounding) electrode, and an intervening dielectric material. In some implementations, the solid material 810 or shell 806 can act as the low voltage (grounding) electrode. Electricity at high voltage (e.g., 1-50 kV) may be supplied to each tube 808. In operation, gas to be treated may enter the tubes 808 at one axial end of the reactor 800 and exist as flowing plasma (NTP) through the tubes 808. Treated gas may discharge from the tubes 808 at the other axial end of the reactor 800. Catalyst for NTP catalysis can be disposed in the tubes 808.

The gas to be treated that that enters tubes 808 may include a combination of [1] gas 108 having sulfur compounds and [2] oxidants(s) 110 if the reactor 800 has catalyst. In the case, the discharge (treated) gas that discharges from the tubes 808 (and thus from the reactor 800) may be gas 112, as discussed, and sent, for example, to a quench tower 104 (FIGS. 1-3).

The gas to be treated that that enters tubes 808 may include oxidants(s) 110 (and not gas 108) if the reactor 800 does not have catalyst. In this case, the discharge (treated) gas that discharges from the tubes 808 (and thus from the reactor 800) may be oxidative reactive species sent to a vessel having catalyst in the NTP catalytic unit, such as discussed with respect to FIG. 5.

FIG. 9 is a membrane degassing unit 900 that may be utilized to treat the bottom stream 116 (acidic water) from the quench tower 104 of FIGS. 1-3 to remove dissolved gases. The dissolved gases removed include $SO_x$ including $SO_2$. As for $SO_3$ most of the $SO_3$ may have reacted with the water in the quench tower 104 such that $SO_3$ is generally not a dissolved gas that can be removed (degassed). However, in implementations, while most of $SO_3$ may react with water to form, for example, sulfuric acid, some of $SO_3$ may be degassed before the $SO_3$ reacts with water.

The membrane degassing unit 900 may be labeled as a membrane-based degassing unit, membrane stripping unit, or membrane-based stripping unit. The membrane degassing unit 900 includes a membrane 900, which may be in a housing 904. The membrane degassing unit 900 can include more than one membrane 900. The membrane degassing unit 900 may include a feed pump 906 to receive the bottoms stream 116 and discharge at increased pressure the bottoms stream 116 to the housing 904. The feed pump 906 may discharge the bottoms stream 116 to a region (volume) 908 in the housing 904 on one side of (e.g., above) the membrane 902. A vacuum may be pulled (applied) in a region (volume) 906 in the housing 904 on the other side of (e.g., below) the membrane 902 via a vacuum pump 910. Due to the pressure differential across the membrane 902, dissolved gases may be stripped (degassed) from the bottoms stream 116 through the membrane 902 as permeate. The removed dissolved gases 312 (including $SO_x$) may flow to and through (pulled by) the vacuum pump 910. The removed dissolved gases 312 may be sent from the vacuum pump 910 to a furnace (e.g., Claus furnace) of an SRU. The bottoms stream 116 minus the removed dissolve gases 312 may be retentate that discharges from the region 908 (retentate side) of membrane degassing unit 900 as treated water 314. Some or all of the treated water can be the makeup water 118 (FIGS. 1-3) sent to the quench tower 104 (FIGS. 1-3).

The membrane degassing unit 900 may be the membrane degassing unit 318 in the sour water treatment unit 316 of FIG. 3. In other implementations, the system 300 (FIG. 3) does not utilize a sour water treatment unit 316, but instead the membrane degassing unit 900 takes the place of (replaces) the sour water treatment unit 316 in the system 300, and is dedicated to the system 300 for removing $SO_x$ 312 as dissolved gases from the bottom stream 116 to give the treated water 314.

Lastly, the membrane degassing unit 900 can be configured to have multiple membranes 902 as tubular membranes in the housing 904, and in which the bore of the tubular membranes is the permeate side and the region in the housing 904 external to the tubular membranes is the retentate side. If so, the retentate side (region external to the tubular membranes) may receive the bottoms stream 116 from the feed pump 906, and the vacuum applied to (pulled on) the bore (permeate side) of the membranes via the vacuum pump 910. Due to the pressure differential across the membrane material of the tubular membranes, dissolved gases 312 may be stripped (degassed) from the bottoms stream 116 through the membrane material into each bore the tubular membranes as permeate. Thus, the treated water 314 may discharge as retentate from the retentate side that is the region external to the tubular membranes, and the dissolved gases (e.g., $SO_x$) removed from the bottoms stream 116 discharged from the respective bore of the tubular membranes to and through the vacuum pump 910.

FIG. 10 is a membrane degassing unit 1000 that can be utilized to receive the bottom stream 116 (acidic water) from the quench tower 104 (FIGS. 1-3) to remove dissolved gaseous components (including $SO_x$) and discharge treated water 314. The treated water 314 is the bottoms stream 116 minus the removed gaseous components 312. The treated water 314 is less acidic than the bottoms stream 116. The membrane degassing unit 1000 may be known as a membrane-based degassing unit, membrane stripping unit, or membrane-based stripping unit. The degassing of the bottoms stream 116 of dissolved gaseous components can be characterized as stripping the bottoms stream of the dissolve gaseous components, though no stripping agent or stripping gas is generally employed. Instead, a vacuum is applied, as discussed below, to strip the dissolved gases from the bottoms stream 116 to give the removed dissolved gases 312.

The membrane degassing unit 1000 includes multiple hollow fiber membranes 1002 (e.g., as tubular membraned) in a housing 1004. The hollow fiber membranes 1002 may each be a porous (e.g., mesoporous) hydrophobic membrane. A "mesoporous" membrane may be material having pores in the range of 2 nanometer (nm) to 50 nm. Mesoporous may be an implementation. However, the process can be operated depend on the operating parameters (e.g., operating pressure) to accommodate generally 0.02 micron to 2 micron.

The exploded view 1006 is a scanning electron microscope (SEM) image of an axial end of a hollow fiber membrane 1002. In the illustrated implementation, the membrane is a hollow fiber type of membrane but can be other types of membranes, e.g., flat sheet membrane, tubular membrane, etc.

The bore 1008 of each hollow fiber membrane 1002 is the permeate side, and the region 1010 in the housing 1004 external to the hollow fiber membranes 1002 is the retentate side. The retentate (or shell) side (region 1010 external to the tubular membranes 1002) may receive the bottoms stream 116. A feed pump can be employed to provide the bottoms stream 116 to the retentate side. In operation, a vacuum is applied to (pulled on) the bore 1008 (permeate side) of each membrane 1002 via a vacuum pump (not shown). Due to the pressure differential across the membrane material 1012 of the hollow fiber membranes 1002, dissolved gases may be stripped (degassed) from the bottoms stream 116 through the membrane material 1012 into each bore 1008 the tubular membranes 1002 as permeate. Thus, the treated water 314 may discharge as retentate from the retentate side that is the region 1010 external to the tubular membranes 1002. The dissolved gases (e.g., $SO_x$) removed from the bottoms stream 116 may discharge from the respective bore 1008 (permeate side) of the tubular membranes as removed dissolved gases 312 (e.g., primarily $SO_x$) to and through the vacuum pump.

The membrane 902 (FIG. 9) and membranes 1002 (FIG. 10) may be an organic material, such as a polymer. Examples of polymers for the membrane material include PVDF, PTFE (Teflon™), PE, PP, PEEK, or PBI, or any combinations thereof. The pore size of the membranes 902, 1002 (e.g., mesoporous hydrophobic membrane) may be in the range of 0.02 μm to 2.0 μm. A more narrow distribution of pore size than this stated range may be implemented within this stated range. As mentioned, for a mesoporous hydrophobic membrane, the range may be 2 nm to 50 nm.

Desorption (degassing) of dissolved gas is known in membrane industry as membrane degassing. FIGS. 9-10 systems may incorporate existing commercial system, such as 3M™ Liqui-Cel™ Membrane Contactors (utilized for degassing liquids) or DuPont Ligasep™ that utilizes a polymethylpentene (PMP) hollow fiber membrane to remove dissolved gases from liquids. 3M™ Liqui-Cel™ is available from 3M Separation and Purification Sciences Division, Charlotte, North Carolina USA. DuPont Ligasep™ is available from DuPont de Nemours, Inc., having headquarters in Wilmington, Delaware USA.

The FIG. 10 system may be different from the FIG. 9 system. On the other hand, basically, the FIG. 9-10 systems can be the same, even though represented as depicted with different details. In FIG. 10, the feed pump and vacuum pump are not shown. FIG. 10 shows the representative example of membrane module configuration.

For FIGS. 9-10, hydrophobic mesoporous hollow fiber membrane can be bundled as hollow fiber module and utilized to contact two streams, acidic water and vacuum. The membrane can be in planar geometry (flat sheet), hollow fiber, or tubular membrane. Membrane material can be organic or inorganic. As indicated, membrane organic materials can include polysulfone (PSF), polyethersulfone (PES), polyvinylidenedifluoride (PVDF), polyacrylonitrile (PAN), polytetrafluoroethylene (PTFE or Teflon), polyamide-imide (PAI), polyimides (PIs) or co-polyimides, polyethylene (PE), polypropylene (PP), cellulose acetate (CA), Polyetheretherketone (PEEK), and/or polybenzimidazole (PBI), etc. In addition to or in lieu of these materials, polymeric material generally with surface modification can be included. For instance, plasma polymerization or direct fluorination on top of any polymeric materials to make tje polymer material hydrophobic. The membrane material can be inorganic materials, such as ceramics (e.g., oxides of alumina, titania or zirconia), glass (silicon oxide or silica), zeolites, and carbons. The membrane material can be mixed matrix materials (MMMs) including the mixture of inorganic material and polymeric materials. As discussed, in implementations, average pore size of is in the range of 0.02 micrometer to 2 micrometers. The upper and lower limits on the pore density of the membrane is based on surface porosity, is in the range of 5%-60% and overall porosity is in the range of 30%-90%.

Figure 11:
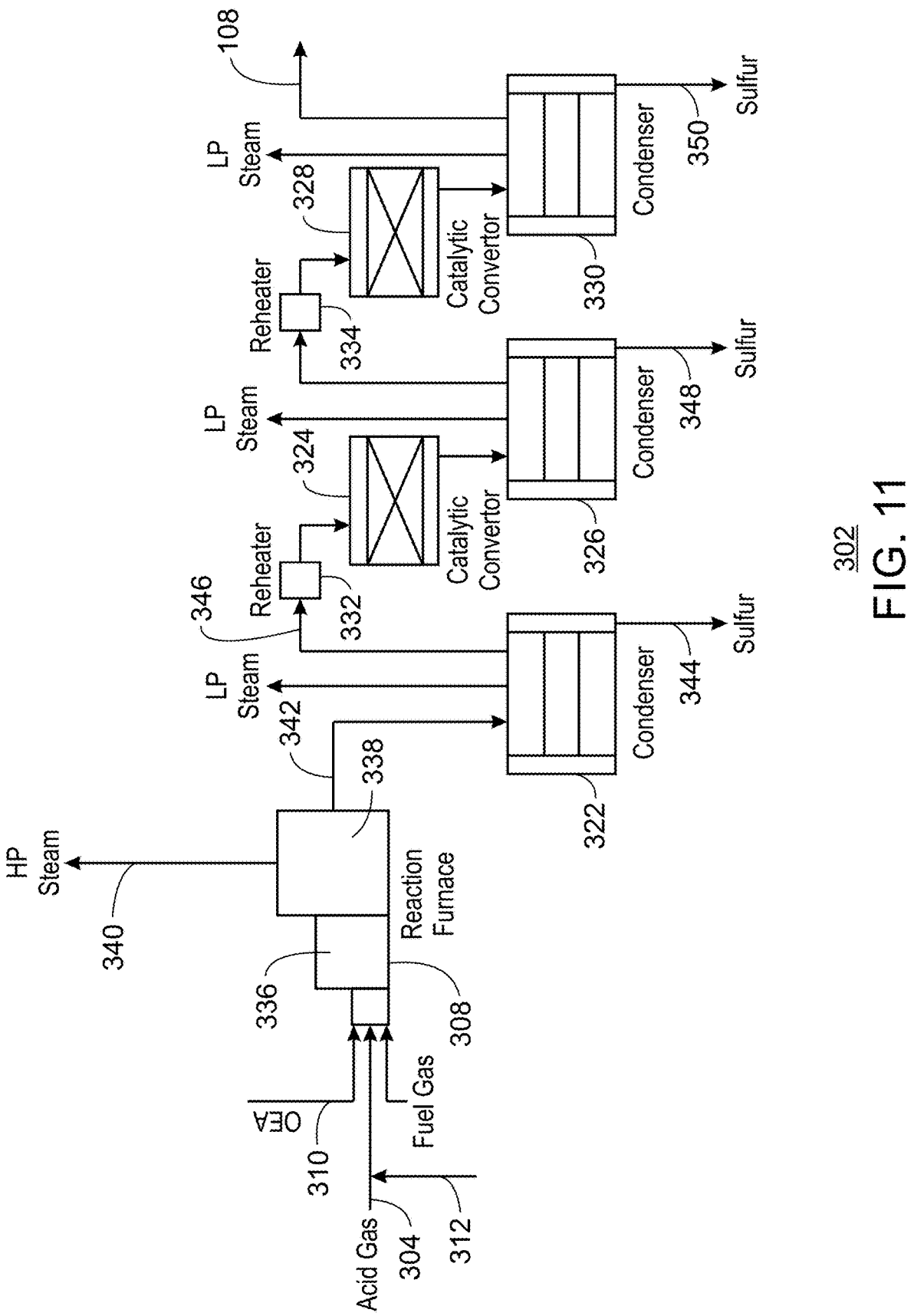
FIG. 11 is a diagram of an example of the sulfur recovery unit (SRU) of FIG. 3.

FIG. 11 is an example of the SRU 302 of FIG. 3, which is a Claus system or Claus SRU. The SRU 302 (referred to as a Claus system for the discussion of FIG. 11) removes sulfur compounds (e.g., $H_2S$) from a gas 304 (e.g., acid gas). In operation, the SRU 302 (e.g., Claus system) may receive the feed gas 304 and air 310 (e.g., $O_2$-enriched air) to the Claus reaction furnace 308. The feeding of $O_2$-enriched air as compared to feeding normal air to the furnace 308 generally reduces the $N_2$ gas loading on a downstream TGT unit (e.g., system 100 of FIG. 1). The feeding of air 310 as $O_2$-enriched air (as compared to feeding normal air) reduces the flow rate of the tail gas 108 because less $N_2$ gas is present in the tail gas 106. The amount (concentration) of oxygen gas ($O_2$) in vol % in the air 310 as $O_2$-enriched air may be, for example, in the range of 30 vol % to 70 vol %.

The feed gas 304 includes sulfur compounds. The feed gas 304 includes at least $H_2S$ as a sulfur compound. The feed gas 304 may be or include acid gas that may include $H_2S$ and $CO_2$. In implementations, the feed gas 304 may be primarily $H_2S$ or primarily acid gas having $H_2S$. The feed gas 304 may have $H_2S$, for example, in the range of 5 vol % to 90 vol %. The source of the feed gas 304 (e.g., acid gas) may be, for example, a byproduct of processing natural gas (from a natural gas processing plant) or refining sulfur-containing crude oils (from a petroleum refinery), and the like. In addition to $H_2S$, sulfur compounds in the feed gas 304 (e.g., acid gas) may include $SO_2$, COS, $CS_2$, etc. Further, as discussed with respect to FIG. 3 in the context of present embodiments, $SO_2$ 312 may be added to the feed gas 304.

A fuel gas (e.g., natural gas, methane, etc.) may be fed to the furnace 308 to supplement the firing (combustion) in the furnace. The fuel gas may be fed to facilitate maintaining the operating temperature of the furnace 308 within a specified temperature range or at a specified temperature (temperature set point value).

In the illustrated embodiment, the SRU 302 (e.g., Claus system) includes the furnace 308, first condenser 322, first catalytic converter 324, second condenser 326, second catalytic converter 328, and third condenser 330. The condensers 322, 326, 330 may be, for example, shell-and-tube heat exchangers, and utilize water as a cooling medium.

The SRU 302 (Claus system) includes a thermal stage (or thermal section) and a catalytic section. The thermal stage includes the Claus furnace 308 (which acts a thermal reactor) and the first condenser 322 heat exchanger.

The catalytic section of the Claus system includes the catalytic converters 324, 328 (catalytic reactors) and the condensers 326, 330. Thus, in the illustrated implementation, the catalytic section includes two catalytic stages. The first catalytic stage includes the reheater 332, the first catalytic converter 324, and the second condenser 326. The second catalytic stage includes the reheater 334, the second catalytic converter 328, and the third condenser 330. In other implementations, the Claus system can include 1-2 additional catalytic stages (each having a reheater, catalytic converter, and condenser) giving 3 or 4 catalytic stages in the Claus system.

The catalytic converters 324, 328 may be labeled as Claus catalytic converters in having catalyst characterized as Claus catalyst and in performing the Claus reaction. The Claus catalytic converters 324, 328 (Claus catalytic reactors) may each be a vessel having catalyst (e.g., a bed of catalyst) that can be a Claus (or Claus-type) catalyst. The condensers 322, 326, 330 may each be a shell-and-tube heat exchanger utilizing cooling water as cooling medium.

The Claus reaction furnace 308 is a vessel and has a combustion chamber 336. In operation, the air 310, the feed gas 304 (having $H_2S$ and other sulfur compounds), and the fuel gas may be fed to an inlet part of the furnace 308 that mixes the air 310, the feed gas 304, and the fuel gas in a nozzle to ignite the mixture into the furnace flame for combustion in the combustion chamber 336. The air 310, the feed gas 304, and the fuel gas can be fed to the combustion chamber 336.

The oxidation reaction $2H2S+3O_2 \rightarrow 2SO_2+2H_2O$, shown as R18 above, may occur in the Claus reaction furnace 308. The Claus reaction $2H2S+SO_2 \rightarrow 3S+2H_2O$, as indicated in R19 above, may occur in the furnace 308. Thus, the furnace gas flowing from the combustion chamber 336 may include $H_2S$, $SO_2$, $S$, and $H_2O$. The furnace gas may include $CO_2$ from the combustion. The furnace gas may include $N_2$ from the air 310.

The Claus furnace 308 includes (or is associated with) a boiler 338 (e.g., waste heat boiler or WHB). The boiler 338 can be labeled as a heat exchanger part of the furnace 308. The boiler 338 may include a shell-and-tube heat exchange in or of the furnace 308 vessel. The boiler 338 typically uses water as a cooling medium to cool the furnace gas and to generate steam 340 from the water. The boiler 338 cools the furnace gas (from the combustion chamber 336) and generates steam 340 with heat from the furnace gas by vaporizing the water cooling medium of the boiler 338. The boiler 338 can be part of the furnace 308 vessel. Again, the boiler 338 can be a shell-and-tube heat exchanger. In implementations, a vessel wall of the furnace 308 may be the shell of the shell-and-tube heat exchanger.

The furnace gas may be cooled in the boiler 328, such as to less than 315° C. Again, heat from the furnace gas may be utilize to generate steam 340. Steam 340 (e.g., high-pressure steam in the range of 600 pounds per square inch gauge [psig] to 900 psig) may be generated from the water cooling medium (e.g., cooling water such as boiler feedwater, demineralized water, steam condensate, etc.) on the side of the boiler 338 (heat exchanger) opposite the furnace gas. The steam 340 may be discharged from the furnace 308 (e.g., as a co-product).

The furnace exhaust gas 342 (cooled furnace gas, e.g., less than 315° C.) is discharged from the boiler 338 (and thus discharges from the furnace 308) to the first condenser 322. The furnace exhaust gas 342 may include $H_2S$, $SO_2$, S vapor, $H_2O$, and $CO_2$. The furnace exhaust gas 342 may include $N_2$ (greater than trace amounts) if the air 310 is not substantially pure $O_2$ and thus has $N_2$. The furnace exhaust gas 342 may be characterized as a process stream in having the $H_2S$ to be converted and elemental sulfur to be recovered.

The first condenser 322 may be a shell-and-tube heat exchanger. The condenser 322 may cool the furnace exhaust gas 342, thereby condensing elemental sulfur vapor in the furnace exhaust gas 342. The cooling medium may be cooling water, such as boiler feedwater, demineralized water, steam condensate, etc. The condenser 322 may discharge the condensed sulfur as liquid elemental sulfur 344 (analogous to stream 306 of FIG. 3), such as to a sulfur receiver.

The sulfur receiver may be labeled as a sulfur pit, which can include a receptacle, container, or vessel, and so on. The sulfur receiver or sulfur pit may be a storage vessel in which liquid sulfur is accumulated and stored. A sulfur pit may temporarily accommodate elemental S extracted from an SRU or similar system and that may be conveyed for further processing or to transportation systems, and the like.

In cooling the furnace exhaust gas 342, the condenser 322 may utilize heat from the furnace gas 342 to vaporize the cooling water (cooling medium) into steam. The steam may be, for example, low pressure (LP) steam, e.g., less than 150 psig. The steam may discharge from the first condenser 322 for utilization at the facility or plant having the SRU, or by other users.

Process gas 346 may discharge from the first condenser 322 through a reheater 332 to the first catalytic converter 324. The process gas 346 may generally be the furnace exhaust gas 342 not condensed. In other words, the process gas 346 may be the furnace exhaust gas 342 minus the removed elemental sulfur 344. This process gas 346 may be labeled as the gas discharged from the SRU thermal section, and may include $H_2S$, $SO_2$, $H_2O$, $CO_2$, typically $N_2$, and typically entrained residual S. The process gas 346 may be labeled as a process stream in having $H_2S$ and $SO_2$ to be converted into elemental S in the Claus reaction.

The reheater 332 heat exchanger heats the process gas 346. The reheater 332 may facilitate control of catalyst bed temperature in the catalytic converter 324. The reheater 332 (and downstream reheater 334) may be, for example, an indirect steam reheater (e.g., shell- and tube heat exchanger) in which the process stream (gas) is heated with steam as heating medium. The reheater may be, for example, a fired-reheater (e.g., direct-fired heater) (e.g., a burner) that burns or combusts fuel gas or acid gas to heat the process stream.

The process gas 346 as heated by the reheater 332 enters the first catalytic converter 324. The first catalytic converter 324 (as well as the second catalytic converter 328) may perform the Claus reaction converting $H_2S$ and $SO_2$ in the process gas to elemental S and $H_2O$. The process gas discharges from the first catalytic converter 324 to the second condenser 326 (e.g., shell-and-tube heat exchanger). The condenser 326 condenses elemental sulfur in the process gas into the liquid elemental sulfur 348 (analogous to stream 306 of FIG. 3) discharged from the condenser 326, such as to a sulfur receiver (e.g., sulfur pit). Like the first condenser 322, the cooling medium in the second condenser 326 is cooling water. The second condenser 326 may utilize heat from the process gas to vaporize the cooling water into steam, and discharge the steam, e.g., LP steam less than 150 psig. The process gas minus the removed condensed sulfur (liquid sulfur 348) may be forwarded from the first condenser 322 through the next reheater 334 to the second catalytic converter 328 of the next catalytic stage.

As mentioned, the second catalytic converter 328 may perform the Claus reaction converting $H_2S$ and $SO_2$ in the process gas to elemental S and $H_2O$. The process gas discharges from the second catalytic converter 328 to the third condenser 330 (e.g., shell-and-tube heat exchanger). The condenser 330 condenses elemental sulfur in the process gas into the liquid elemental sulfur 350 (analogous to stream 306 of FIG. 3) discharged from the condenser 330, such as to a sulfur receiver (e.g., sulfur pit). Like the first condenser 322 and the second condenser 326, the cooling medium in the third condenser 330 is cooling water. The third condenser 330 may utilize heat from the process gas in the third condenser 330 to vaporize the cooling medium into steam, and discharge the steam, e.g., LP steam less than 150 psig.

The process gas minus the removed condensed sulfur (liquid sulfur 350) may discharge from the third condenser 330 as SRU tail gas 108 (e.g., Claus tail gas). The Claus system that discharges the tail gas 108 can remove, for example, 95% to 98% of $H_2S$ in the entering gas 304. The tail gas 108 from the Claus system may have the remaining (residual) $H_2S$, such 2% to 5% of the equivalent $H_2S$ in the feed gas. The tail gas 108 may include $H_2S$, $SO_2$, $H_2O$, $CO_2$, $N_2$, S, and other components. The tail gas 108 may be sent to a TGT unit (e.g., 100 of FIG. 1), as discussed with respect to FIGS. 1 and 3.

FIG. 12 is a method 1200 of removing sulfur compounds from a gas. At block 1202, the method includes discharging tail gas (e.g., Claus tail gas) having sulfur compounds from an SRU (e.g., Claus system) to an NTP catalytic unit having an NTP reactor. The NTP reactor may be, for example, a DBD reactor. Other types of NTP reactor are applicable.

At block 1204, the method includes providing an oxidant to the NTP reactor and placing the oxidant in an NTP state in the NTP reactor to give an oxidative reactive species formed from the oxidant. The oxidant may include, for example, water or $O_2$, or both, and the oxidative reactive species include OH, elemental O, or $O_3$, or any combinations thereof. In implementations, the oxidant includes air providing at least some of the $O_2$ and at least some of the water.

At block 1206, the method includes oxidizing the sulfur compounds with the oxidative reactive species and catalyst in the NTP catalytic unit into $SO_x$. In implementations, the method may include flowing the tail gas having sulfur compounds discharged from the SRU through the NTP reactor in the NTP catalytic unit, wherein oxidizing the sulfur compounds with the oxidative reactive species and the catalyst occurs in the NTP reactor, and wherein the NTP reactor is an NTP catalytic reactor having the catalyst. If so, at least a portion of the catalyst is disposed in a plasma discharge zone of the NTP catalytic reactor, and/or the tail gas having sulfur compounds discharged from the SRU has at least some of the oxidant provided to the NTP catalytic reactor. In other implementations, the method includes flowing the tail gas having sulfur compounds discharged from the SRU through a vessel (having the catalyst) in the NTP catalytic unit, and injecting the oxidative reactive species from the NTP reactor into the vessel (e.g., a conduit), wherein oxidizing the sulfur compounds with the oxidative reactive species and the catalyst occurs in the vessel.

Sulfur compounds in the tail gas oxidized in the NTP catalytic unit into $SO_x$ may include at $H_2S$, COS, $CS_2$, S vapor, or $CH_3SH$. The $SO_x$ may include $SO_2$ and $SO_3$. The method may also include oxidizing CO in the tail gas with the catalyst and the oxidative reactive species in the NTP catalytic unit into $CO_2$.

At block 1208, the method includes discharging process gas from the NTP catalytic unit to a quench tower. The process gas includes the tail gas minus the sulfur compounds oxidized into $SO_x$ and having the $SO_x$ formed by oxidizing the sulfur compounds. The method includes absorbing $SO_x$ from the process gas into water in the quench tower. The water having the $SO_x$ as absorbed may be acidic water.

At block 1210, the method includes discharging from the quench tower an overhead gas having the process gas without the $SO_x$ absorbed into the water. The overhead does not include water vapor in the process gas that condensed in the quench tower. In implementations, the overhead gas has less than 100 ppmv of $SO_x$ and less than 100 ppmv of sulfur compounds.

At block 1212, the method includes discharging from the quench tower a bottoms stream having the water with the $SO_x$ as absorbed to a membrane degassing unit having a membrane. The method includes removing $SO_x$ from the water in the membrane degassing unit.

At block 1214, the method includes discharging from the membrane degassing unit the $SO_x$ as removed to a reaction furnace of the SRU. The method may include discharging from the membrane degassing unit the bottoms stream minus the $SO_x$ removed to the quench tower as makeup water.

In alternate nomenclature, the oxidant (e.g., $H_2O$, $O_2$) can be labeled as an oxidant source, and the oxidative reactive species (e.g., OH, O) labeled as oxidant.

An embodiment is a method of removing sulfur compounds from a gas, including discharging a tail gas (e.g., Claus tail gas) having sulfur compounds from an SRU (e.g., Claus system) to an NTP catalytic unit including an NTP reactor, providing an oxidant to the NTP reactor and placing the oxidant in an NTP state in the NTP reactor to give an oxidative reactive species formed from the oxidant, oxidizing the sulfur compounds with the oxidative reactive species and catalyst in the NTP catalytic unit into $SO_x$. The sulfur compounds in the tail gas oxidized in the NTP catalytic unit into $SO_x$ may be at least one of $H_2S$, COS, $CS_2$, S vapor, or $CH_3SH$. The $SO_x$ may include $SO_2$ and $SO_3$. The oxidant may include water or oxygen gas ($O_2$), or both, wherein the oxidative reactive species comprises hydroxide (OH), oxygen (O), or ozone ($O_3$), or any combinations thereof. In implementations, the oxidant includes air providing at least some of the oxygen gas ($O_2$) and at least some of the water. The method may include oxidizing CO in the tail gas with the catalyst and the oxidative reactive species in the NTP catalytic unit into $CO_2$. The method includes discharging process gas from the NTP catalytic unit to a quench tower, the process gas including the tail gas minus the sulfur compounds oxidized into $SO_x$ and having the $SO_x$ formed by oxidizing the sulfur compounds. The method includes absorbing $SO_x$ from the process gas into water in the quench tower, discharging from the quench tower an overhead gas having the process gas without the $SO_x$ absorbed into the water, discharging from the quench tower a bottoms stream including the water having the $SO_x$ as absorbed (e.g., giving acidic water) to a membrane degassing unit having a membrane, and removing $SO_x$ from the water in the membrane degassing unit. The method includes discharging the $SO_x$ as removed from the membrane degassing unit to a reaction furnace of the SRU. The method may include discharging from the membrane degassing unit to the quench tower the bottoms stream minus the $SO_x$ removed.

The overhead gas discharged from the quench tower may have, for example, less than 100 ppmv of $SO_x$ and less than 100 ppmv of sulfur compounds. The overhead gas generally does not include the water vapor in the process gas that condensed in the quench tower. The water having the $SO_x$ as absorbed may be acidic water.

The method may include flowing the tail gas having sulfur compounds discharged from the SRU through the NTP reactor in the NTP catalytic unit, wherein oxidizing the sulfur compounds with the oxidative reactive species and the catalyst occurs in the NTP reactor, and wherein the NTP reactor is an NTP catalytic reactor having the catalyst, e.g., the catalyst disposed in a plasma discharge zone of the NTP catalytic reactor. If so, the tail gas having the sulfur compounds discharged from the SRU may include at least some of the oxidant provided to the NTP catalytic reactor.

The method may include flowing the tail gas having sulfur compounds discharged from the SRU through a vessel (e.g., conduit) in the NTP catalytic unit, wherein the vessel has the catalyst. If so the method includes injecting the oxidative reactive species from the NTP reactor into the vessel, wherein oxidizing the sulfur compounds with the oxidative reactive species and the catalyst occurs in the vessel.

Another embodiment is a system for removing sulfur compounds from a gas, including an NTP catalytic unit operationally coupled to an SRU (e.g., Claus system) to receive SRU tail gas (e.g., Claus tail gas) having sulfur compounds discharged from the SRU and oxidize the sulfur compounds via a catalyst and an oxidative reactive species into $SO_x$. The sulfur compounds in the SRU tail gas oxidized in the NTP catalytic unit into $SO_x$ may include at least one of $H_2S$, COS, $CS_2$, S vapor, or $CH_3SH$, and wherein the $SO_x$ includes $SO_2$ and $SO_3$.

The NTP catalytic unit includes an NTP reactor (e.g., DBD reactor) to receive an oxidant and place the oxidant in an NTP state to give the oxidative reactive species formed from the oxidant. The oxidant may include water or oxygen gas, or both, and wherein the oxidative reactive species may be at least one of hydroxide (OH), oxygen (O), or ozone $(O_3)$. The NTP catalytic unit may be configured to oxidize carbon monoxide (CO) in the SRU tail gas with the oxidative reactive species and the catalyst into carbon dioxide $(CO_2)$.

The system includes a quench tower operationally coupled to the NTP catalytic unit to receive process gas discharged from the NTP catalytic unit and absorb $SO_x$ from the process gas into water, and discharge an overhead gas having the process gas without the $SO_x$ absorbed into the water and discharge a bottoms stream including the water having the $SO_x$ as absorbed. The overhead gas discharged from the quench tower may have less than 100 ppmv of $SO_x$ and less than 100 ppmv of sulfur compounds, wherein the water having the $SO_x$ as absorbed is acidic water.

The system includes a membrane degassing unit comprising a membrane operationally coupled to the quench tower to receive the bottom stream and remove $SO_x$ from the bottom stream and discharge the $SO_x$ as removed to a reaction furnace of the SRU. The membrane degassing unit may configured to discharge water minus the $SO_x$ removed in the membrane degassing unit to the quench tower.

In implementations, the NTP reactor includes the catalyst to receive the SRU tail gas to oxidize the sulfur compounds with the oxidative reactive species and the catalyst in the NTP reactor, wherein the NTP reactor is an NTP catalytic reactor, and at least a portion of the catalyst is disposed in a plasma discharge zone of the NTP catalytic reactor.

In other implementations, the NTP catalytic unit includes a vessel (e.g., conduit) having the catalyst to receive the SRU tail gas from the SRU and to receive the oxidative reactive species from the NTP reactor, and oxidize the sulfur compounds with the catalyst and the oxidative reactive species in the vessel. In these implementation, the NTP catalytic unit may include a first conduit coupling the vessel to the NTP reactor for the oxidative reactive species to flow from the NTP reactor through the first conduit to the vessel, and the vessel may be a second conduit.

A number of implementations have been described. Nevertheless, it will be understood that various modifications may be made without departing from the spirit and scope of the disclosure.

What is claimed is:

1. A method of removing sulfur compounds from a gas, comprising:
   discharging a tail gas comprising sulfur compounds from a sulfur recovery unit (SRU) to a non-thermal plasma (NTP) catalytic unit comprising an NTP reactor;
   providing an oxidant to the NTP reactor and placing the oxidant in an NTP state in the NTP reactor to give an oxidative reactive species formed from the oxidant;
   oxidizing the sulfur compounds with the oxidative reactive species and catalyst in the NTP catalytic unit into sulfur oxides (SOx);
   discharging process gas from the NTP catalytic unit to a quench tower, the process gas comprising the tail gas having the SOx formed by oxidizing the sulfur compounds;
   absorbing SOx from the process gas into water in the quench tower;
   discharging from the quench tower an overhead gas comprising the process gas without the SOx absorbed into the water;
   discharging from the quench tower a bottoms stream comprising the water having the absorbed SOx to a membrane degassing unit comprising a membrane;
   removing SOx from the water in the membrane degassing unit; and
   discharging the SOx as removed from the membrane degassing unit to a reaction furnace of the SRU.

2. The method of claim 1, wherein the overhead gas comprises less than 100 part per million by volume (ppmv) of SOx and less than 100 ppmv of sulfur compounds, wherein the water having the absorbed SOx is acidic water, wherein the SRU comprises a Claus system, wherein the tail gas comprises Claus tail gas, and wherein the overhead gas does not comprise water vapor in the process gas that condensed in the quench tower.

3. The method of claim 1, comprising oxidizing carbon monoxide (CO) in the tail gas with the catalyst and the oxidative reactive species in the NTP catalytic unit into carbon dioxide (CO2), wherein the sulfur compounds in the tail gas oxidized in the NTP catalytic unit into SOx comprise at least one of hydrogen sulfide (H2S), carbonyl sulfide (COS), carbon disulfide (CS2), elemental sulfur(S) vapor, or methanethiol (CH3SH), and wherein the SOx comprises sulfur dioxide (SO2) and sulfur trioxide (SO3).

4. The method of claim 1, wherein the oxidant comprises water or oxygen gas (O2), or both, and wherein the oxidative reactive species comprises hydroxide (OH), oxygen (O), or ozone (O3), or any combinations thereof.

5. The method of claim 4, wherein the oxidant comprises air providing at least some of the oxygen gas (O2) and at least some of the water.

6. The method of claim 1, comprising flowing the tail gas having sulfur compounds discharged from the SRU through the NTP reactor in the NTP catalytic unit, wherein oxidizing the sulfur compounds with the oxidative reactive species and the catalyst occurs in the NTP reactor, and wherein the NTP reactor comprises an NTP catalytic reactor having the catalyst.

7. The method of claim 6, wherein at least a portion of the catalyst is disposed in a plasma discharge zone of the NTP catalytic reactor.

8. The method of claim 6, wherein the tail gas comprising sulfur compounds discharged from the SRU comprises at least some of the oxidant provided to the NTP catalytic reactor.

9. The method of claim 1, comprising:

flowing the tail gas having sulfur compounds discharged from the SRU through a vessel in the NTP catalytic unit, wherein the vessel has the catalyst;

injecting the oxidative reactive species from the NTP reactor into the vessel, wherein oxidizing the sulfur compounds with the oxidative reactive species and the catalyst occurs in the vessel.

10. The method of claim 9, wherein the vessel is a conduit having the catalyst.

11. The method of claim 1, comprising discharging from the membrane degassing unit to the quench tower the bottoms stream minus the SOx removed.

\* \* \* \* \*